(12) United States Patent
Hedesiu et al.

(10) Patent No.: US 11,066,541 B2
(45) Date of Patent: *Jul. 20, 2021

(54) MULTIMODAL POLYPROPYLENE COMPOSITION FOR PIPE APPLICATIONS

(71) Applicants: ABU DHABI POLYMERS CO. LTD (BOROUGE) L.L.C., Abu Dhabi (AE); BOREALIS AG, Vienna (AT)

(72) Inventors: Cristian Hedesiu, Abu Dhabi (AE); Kauno Alastalo, Porvoo (FI)

(73) Assignees: ABU DHABI POLYMERS COMPANY LIMITED (BOROUGE), Abu Dhabi (AE); BOREALIS AG, Vienna (AT)

( * ) Notice: Subject to any disclaimer, the term of this patent is extended or adjusted under 35 U.S.C. 154(b) by 933 days.

This patent is subject to a terminal disclaimer.

(21) Appl. No.: 14/784,735

(22) PCT Filed: Apr. 22, 2014

(86) PCT No.: PCT/EP2014/001072
§ 371 (c)(1),
(2) Date: Oct. 15, 2015

(87) PCT Pub. No.: WO2014/173533
PCT Pub. Date: Oct. 30, 2014

(65) Prior Publication Data
US 2016/0060441 A1 Mar. 3, 2016

(30) Foreign Application Priority Data
Apr. 22, 2013 (EP) .................................... 13002098

(51) Int. Cl.
*C08L 23/10* (2006.01)
*F16L 9/12* (2006.01)
*C08L 23/14* (2006.01)

(52) U.S. Cl.
CPC .............. *C08L 23/10* (2013.01); *C08L 23/14* (2013.01); *C08L 23/142* (2013.01); *F16L 9/12* (2013.01);
(Continued)

(58) Field of Classification Search
CPC .... C08L 23/14; C08L 23/142; C08L 2203/18; C08L 2205/025; C08F 210/06; C08F 2/001; C08F 4/6492; C08F 4/6543
USPC ....... 525/240, 53, 232, 89, 199, 88, 95, 228, 525/237, 191, 52, 71, 185, 190, 200, 221, 525/70, 216, 323, 333.7, 432, 524, 57, 525/74, 98, 133, 166, 187, 189, 192, 194, 525/195, 209, 222, 227, 236, 284, 288, 525/332.6, 418, 437, 439, 458, 461, 469, 525/478, 533, 66, 100, 102, 107, 123, 525/130, 132, 148, 151, 152, 176, 177, 525/179, 183, 186, 205, 207, 210, 212, 525/214, 217, 218, 229, 235, 241, 242, 525/254, 274, 306, 308, 321, 324, 329.3, 525/330.3, 333.8, 342, 387, 393, 398, 525/408, 424, 440.071, 445, 448, 450, 525/453, 455, 462, 464, 466, 467, 477, 525/523, 534, 535, 537, 540, 55, 60, 64, 525/67, 68, 69, 77, 78, 92 R, 93, 97; 428/36.9, 220, 36.92, 523, 35.7, 516, 349, 428/379, 339, 354, 35.2, 418, 195.1, 212, 428/213, 216, 218, 355 EN, 36.91, 375, 428/413, 423.1, 461, 141, 317.3, 344, 428/34.1, 402, 41.3, 457, 480, 483, 500, 428/507, 515, 517, 518, 519, 137, 138, 428/143, 156, 200, 201, 215, 221, 304.4, 428/317.7, 318.4, 319.7, 319.9, 327, 334, 428/336, 34.8, 355 AC, 355 BL, 356, 428/35.8, 366, 36.1, 36.4, 36.5, 370, 372, 428/373, 380, 383, 394, 401, 405, 412, 428/414, 416, 424.8, 425.1, 425.8, 428, 428/432, 447, 451, 462, 476.9, 484.1, 428/486, 508, 511, 513, 521, 702, 704, 428/71, 95; 264/328.1, 176.1, 328.17, 264/494, 540, 141, 209.1, 210.2, 319, 264/537, 105, 171.13, 173.19, 241, 322, 264/45.4, 477, 478, 523, 531, 555, 103, 264/12, 13, 140, 145, 162, 171.1, 171.26, 264/173.11, 173.14, 173.16, 173.17, 175, 264/1.24, 1.28, 209.2, 209.3, 210.1, 264/210.8, 211, 211.12, 235, 236, 242,
(Continued)

(56) References Cited

U.S. PATENT DOCUMENTS 3,242,150 A 3/1966 Scoggin
3,324,093 A 6/1967 Alleman
(Continued)

FOREIGN PATENT DOCUMENTS

EP 0 250 169 12/1987
EP 0 188 125 5/1990
(Continued)

OTHER PUBLICATIONS

International Search Report dated Aug. 11, 2014 for International Application No. PCT/EP2014/001072.
(Continued)

*Primary Examiner* — Gerard Higgins
*Assistant Examiner* — Kevin C Ortman, Jr.
(74) *Attorney, Agent, or Firm* — Fay Sharpe LLP

(57) ABSTRACT

A multimodal propylene copolymer composition suitable for moulding and pipe applications comprising a multimodal propylene copolymer (U).

14 Claims, 1 Drawing Sheet

(52) U.S. Cl.
CPC ....... *C08L 2203/18* (2013.01); *C08L 2205/02* (2013.01); *C08L 2205/025* (2013.01); *C08L 2205/03* (2013.01); *C08L 2205/24* (2013.01); *C08L 2314/02* (2013.01)

(58) Field of Classification Search
USPC .... 264/255, 257, 299, 310, 320, 331.17, 41, 264/46.4, 48, 496, 510, 529, 54, 571, 264/572, 638, 645, 78; 526/348, 348.5, 526/348.2, 64, 348.6, 170, 351, 352, 526/352.2, 65, 66, 123.1, 159, 160, 185, 526/89, 124.2, 124.9, 125.3, 125.4, 127, 526/128, 147, 171, 172, 209, 210, 224, 526/226, 234, 255, 268, 272, 281, 282, 526/283, 292.5, 308, 318.44, 328.5, 335, 526/336, 344, 348.3, 75; 426/348, 348.5, 426/348.2, 64, 348.6, 170, 351, 352, 426/352.2, 65, 66, 123.1, 159, 160, 185, 426/89, 124.2, 124.9, 125.3, 125.4, 127, 426/128, 147, 171, 172, 209, 210, 224, 426/226, 234, 255, 268, 272, 281, 282, 426/283, 292.5, 308, 318.44, 328.5, 335, 426/336, 344, 348.3, 75
See application file for complete search history.

(56) References Cited

U.S. PATENT DOCUMENTS

| | | |
|---|---|---|
| 3,374,211 A | 3/1968 | Marwil et al. |
| 3,405,109 A | 10/1968 | Rohlfing |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,473,660 A | 9/1984 | Albizzati et al. |
| 4,530,912 A | 7/1985 | Pullukat et al. |
| 4,532,311 A | 7/1985 | Fulks et al. |
| 4,543,399 A | 9/1985 | Jenkins, III et al. |
| 4,560,671 A | 12/1985 | Gross et al. |
| 4,578,879 A | 4/1986 | Yokoyama et al. |
| 4,582,816 A | 4/1986 | Miro |
| 4,621,952 A | 11/1986 | Aronson |
| 4,803,251 A | 2/1989 | Goode et al. |
| 4,855,370 A | 8/1989 | Chirillo et al. |
| 4,933,149 A | 6/1990 | Rhee et al. |
| 5,026,795 A | 6/1991 | Hogan |
| 5,391,654 A | 2/1995 | Ahvenainen et al. |
| 2010/0267877 A1* | 10/2010 | Alastalo ................. C08L 23/12 524/380 |

FOREIGN PATENT DOCUMENTS

| | | | |
|---|---|---|---|
| EP | 0 560 035 | 9/1993 | |
| EP | 0 579 426 | 1/1994 | |
| EP | 0 479 186 | 3/1995 | |
| EP | 0 696 293 | 2/1996 | |
| EP | 0 699 213 | 2/1998 | |
| EP | 0 707 513 | 9/1998 | |
| EP | 0 887 379 | 12/1998 | |
| EP | 0 887 380 | 12/1998 | |
| EP | 0 887 381 | 12/1998 | |
| EP | 0 891 990 | 1/1999 | |
| EP | 0 991 684 | 4/2000 | |
| EP | 1 310 295 | 5/2003 | |
| EP | 1 415 999 | 5/2004 | |
| EP | 1 183 307 | 7/2005 | |
| EP | 1 591 460 | 11/2005 | |
| EP | 1 860 125 | 11/2007 | |
| EP | 2361950 A1* | 8/2011 | ............. C08L 23/10 |
| GB | 1 580 635 | 12/1980 | |
| WO | WO 87/07620 | 12/1987 | |
| WO | WO 92/19659 | 11/1992 | |
| WO | WO 92/21705 | 12/1992 | |
| WO | WO 93/11165 | 6/1993 | |
| WO | WO 93/11166 | 6/1993 | |
| WO | WO 1993/19100 | 9/1993 | |
| WO | WO 94/25495 | 11/1994 | |
| WO | WO 97/36939 | 10/1997 | |
| WO | WO 98/12234 | 3/1998 | |
| WO | WO 99/24479 | 5/1999 | |
| WO | WO 99/33842 | 7/1999 | |
| WO | WO 00/29452 | 5/2000 | |
| WO | WO 00/68315 | 11/2000 | |
| WO | WO 2005/087361 | 9/2005 | |
| WO | WO 2007/025640 | 3/2007 | |

OTHER PUBLICATIONS

Written Opinion of the International Searching Authority dated Aug. 11, 2014 for International Application No. PCT/EP2014/001072.
International Preliminary Report on Patentability dated Oct. 27, 2015 for International Application No. PCT/EP2014/001072.

\* cited by examiner

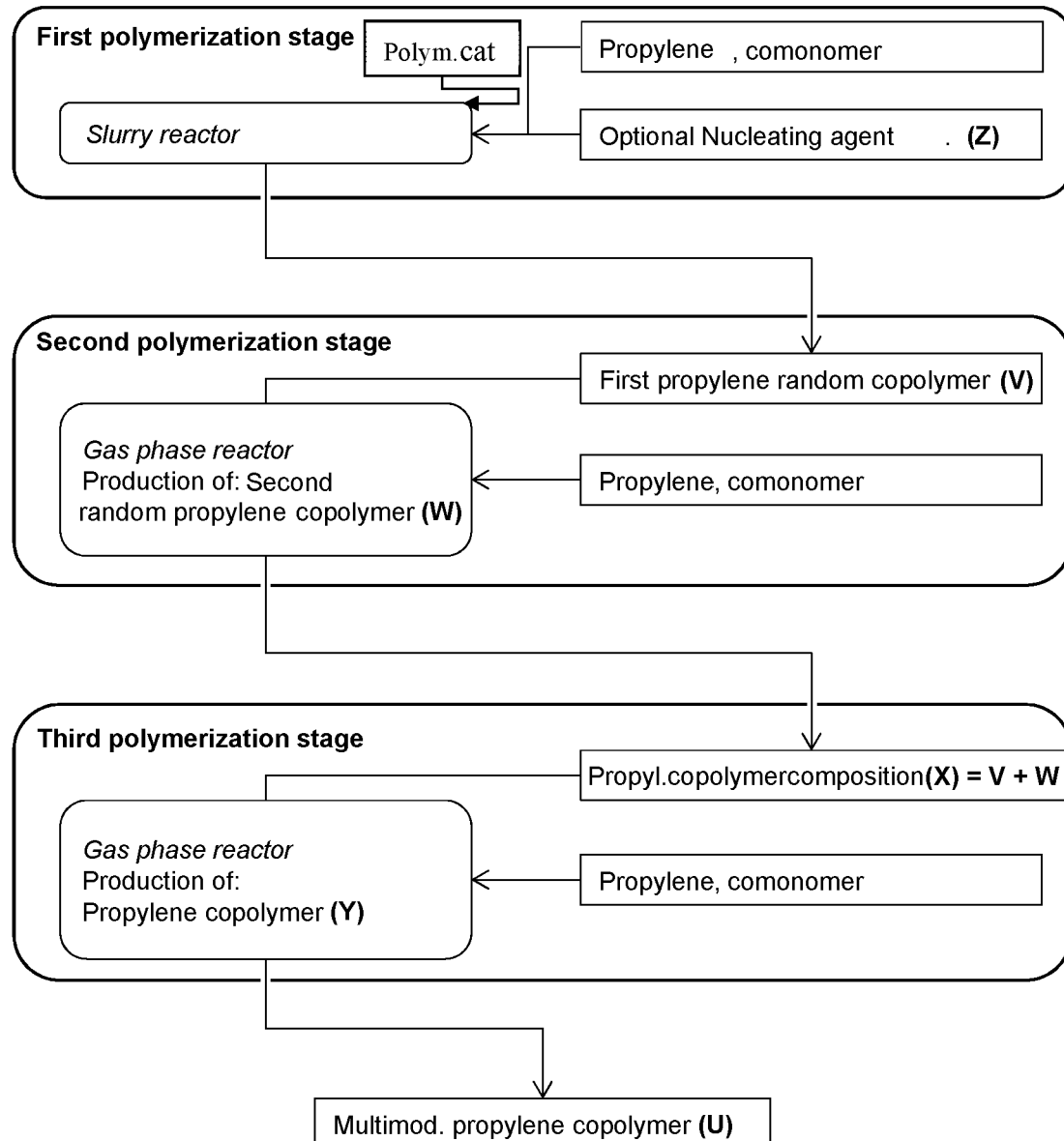

MULTIMODAL POLYPROPYLENE COMPOSITION FOR PIPE APPLICATIONS

INTRODUCTION

The present invention relates to polypropylene compositions with an advantageous balance of properties in regard of mechanical properties including impact and stiffness/flexibility properties, and with advantageous processing properties.

Polypropylene materials are frequently used for various pipe and pipe fitting applications, such as fluid transport, e.g. water or natural gas, during which the fluid is pressurized and/or heated. In particular, polypropylene materials are used in applications for plumbing and heating, such as in-house hot and cold water pressure pipes and fittings, floor and wall heating systems and radiator connections.

Thereby, propylene random copolymers are especially suitable for pressure pipe applications for hot water and industrial pipes as the random copolymers have inter alia good impact performance, stiffness, creep resistance and slow crack properties and long term pressure resistance.

State of the Art

It is well known that increasing one of the impact or stiffness/flexibility properties sacrifices the other.

Moreover, propylene copolymers based pipes for hot and cold water pressure applications are often coloured e.g. Green, Grey, Blue, and White etc. Different pigments have different nucleation effect on propylene random copolymers and variation in intensity of the effect from one colour to another will result in dimensional variations because differences in shrinkage associated with the nucleation. It is desired to have a material having shrinkage properties essentially independent from the colour.

Naturally, processability like extrusion output rate during pipe production and shorter cycle time during injection moulding of fittings should be industrially feasible, as well as the surface quality of the final pipe and/or fitting.

WO 00/68315 (EP 1 183 307) discloses nucleated homo polymer and heterophasic copolymer of propylene and the use thereof in various application mainly concerned with moulding applications. The high melt flow rates of the compositions do not enable pipe applications.

WO 99/24479 of *Borealis* discloses nucleated propylene polymer, however examples disclose homo polymers of propylene and heterophasic copolymers of propylene. The heterophasic copolymers of propylene are stated to be "stiff" (examples 9 and 10, e.g. flexural modulus of around 1500 and 1600 MPa), whereby they are suitable for sewage pipe applications.

WO 2006/010414 discloses a propylene copolymer composition suitable for film and pipe. Said composition does not contain any random copolymer.

WO 2003/016553 is concerned with a composition to be used for film and fibres having melt flow rates (230° C., 2.16 kg) of 16 g/10 min or higher. The compositions are produced by catalyst systems based on metallocene compounds.

EP 885 926 is concerned with compositions having a melt flow rate of 0.6 g/10 min or higher being suitable for uses requiring transparency, stress-whitening resistance and good low temperature impact resistance. All examples have an $MFR_2$ of higher than 1.0 g/10 min except example 6 which has $MFR_2$ of 0.6 g/10 min. The data of Table 1 shows that example 6 has a content of ethylene units of 9.1 wt.-% or 13 mole-%.

There is still a continuous need for new propylene copolymer compositions with advantageous mechanical property balance that meet the growing demands required for pipe applications, particularly for pressure pipe applications, more preferably for hot and cold water pressure pipe applications.

Objective of the Present Invention

The present invention provides a new multimodal polypropylene composition which is highly suitable for pipe applications, preferably for hot and cold water pressure pipe applications. The present invention further provides an article, preferably a pipe, which is preferably a pressure pipe, more preferably a pressure pipe for hot and cold water applications, or a fitting for a pipe which contains the multimodal polypropylene composition of the invention.

Summary of the Invention

The present invention insofar provides
A multimodal polypropylene composition suitable for pipe applications comprising
  a multimodal propylene copolymer (U) with at least one comonomer selected from alpha-olefins with 2 or 4 to 8 carbon atoms in a total amount of 4.0 to 10.0 mole-%, wherein the multimodal polypropylene composition has a melt flow rate $MFR_2$ (2.16 kg, 230° C.) of 0.25 to 1.00 g/10 min determined according to ISO 1133, a content of xylene cold solubles (XCS) of 4.0 to 17.0 wt.-% determined at 25° C. according to ISO 16152, and
  a polydispersity index PI of 2.5 to 4.0 $Pa^{-1}$ determined by rheological measurements according to ISO 6721-1 and ISO 6721-10 as described below under determination methods.

The present invention further provides an article, preferably an moulded article, preferably an injection moulded (IM) or a blown moulded article, more preferably an injection moulded article including fittings for a pipe, as well as a pipe, which is preferably a pressure pipe, more preferably a hot and cold water pressure pipe, comprising the multimodal polypropylene composition of the invention as defined above or below including any preferable embodiments and subgroups thereof.

Definitions

A propylene copolymer herein denotes a polymer consisting essentially of propylene monomer units and comonomer units, whereby the comonomer units in total amount to at least 0.1 mole-%.

A propylene random copolymer denotes a copolymer of propylene monomer units and comonomer units in which the comonomer units are randomly distributed in the polymeric chain. The random copolymer does not contain an elastomeric polymer phase dispersed therein.

As known for skilled person, random copolymers are different from heterophasic polypropylene which is a propylene copolymer comprising a propylene homo or random copolymer matrix component (1) and an elastomeric copolymer component (2) of propylene with one or more of ethylene and $C_4$-$C_8$ alpha-olefin copolymers, wherein the elastomeric (amorphous) copolymer component (2) is dispersed in said propylene homo or random copolymer matrix polymer (1).

A propylene homopolymer thereby denotes a polymer consisting essentially of propylene monomer units. Due to the requirements of large-scale polymerization it may be possible that the propylene homopolymer includes minor amounts of comonomer units, which usually is below 0.1 mole-%, preferably below 0.05 mole-%, most preferably below 0.01 mole-% of the propylene homopolymer.

A nucleating agent denotes herein a compound or composition which is added on purpose to increase the crystallization rate within the solid polymer and lead to an increased degree of crystallinity (and often to a smaller crystal size) of the solid polymer.

Usually, a propylene polymer comprising at least two propylene polymer fractions (components), which have been produced under different polymerisation conditions resulting in different (weight average) molecular weights and/or different comonomer contents for the fractions, preferably produced by polymerizing in multiple polymerization stages with different polymerization conditions, is referred to as "multimodal". The prefix "multi" relates to the number of different polymer fractions the propylene polymer is consisting of. As an example of multimodal propylene polymer, a propylene polymer consisting of two fractions only is called "bimodal", whereas a propylene polymer consisting of three fractions only is called "trimodal".

Thereby the term "different" means that the propylene polymer fractions differ from each other in at least one property, preferably in the weight average molecular weight or comonomer content or both, more preferably at least in the weight average molecular weight.

The form of the molecular weight distribution curve, i.e. the appearance of the graph of the polymer weight fraction as function of its molecular weight, of such a multimodal propylene polymer is at least distinctly broadened in comparison with the curves for the individual fractions.

It is well known that melt flow rate (MFR) of a polymer is an indication of the weight average molecular weight (Mw) of the polymer, the higher the MFR the lower the Mw of the polymer and, respectively, the lower the MFR the higher the Mw of the polymer.

BRIEF DESCRIPTION OF THE DRAWINGS

The FIGURE is a flow chart that illustrates the preferable production process for producing the most preferable multimodal polypropylene composition of the invention and the preferred polypropylene components thereof.

DETAILED DESCRIPTION OF THE INVENTION

It has surprisingly been found that the multimodal polypropylene composition according to the present invention has an advantageous property balance between mechanical properties in view of the Flexural Modulus and Impact properties, as can be seen from the Charpy Notched Impact Strength at cold temperature 0° C. and preferably also at room temperature. The balance between the Flexural Modulus and the Charpy Notched Impact Strength at cold temperature provides sufficient flexibility and good impact properties to the multimodal polypropylene composition of the invention making it highly suitable for moulding applications, preferably for producing a moulded article, preferably an injection moulded (IM) or a blown moulded article, more preferably an injection moulded article including fittings for a pipe, as well as for pipe applications, preferably for producing a pressure pipe, preferably a hot and cold water pressure pipe. More preferably the present multimodal polypropylene composition shows advantageously feasible creep resistance as can be seen from tensile stress. Further preferably, the present multimodal polypropylene composition has advantageous pressure resistance required for pressure pipe applications. The present multimodal polypropylene composition has preferably also an advantageous processing behavior in terms of cycle time of moulded articles like fittings, as well as advantageous extrusion properties. The obtained final article has a uniform shrinkage behavior and a good surface quality.

The multimodal polypropylene composition of the invention and the article thereof are further described below with generalizable preferable embodiments and subgroups thereof and with preferable properties and property ranges thereof. "Generalizable" means herein that any of the preferable embodiments, subgroups, properties and property ranges of the multimodal polypropylene composition of the invention can be combined together, and in any order.

Without binding to any theory it is believed that at least the comonomer content and the content of the cold soluble (XCS) of the multimodal polypropylene composition contribute to the advantageous property balance between Flexural Modulus and Impact properties, as well as to pressure resistance, of the invention.

Preferably the multimodal polypropylene composition of the invention comprises a multimodal propylene copolymer (U) comprising
(A) from 75 to 98 wt.-% of a propylene random copolymer composition (X) which has a melt flow rate $MFR_2$ of 0.25 to 1.0 g/10 min, or a content of comonomer units of from 2.0 to 12.0 mole-%, or both; and
(B) from 2 to 25 wt.-% of a propylene copolymer (Y), wherein the comonomer is selected from at least one of the group consisting of ethylene and $C_4$-$C_8$ alpha-olefins and whereby the propylene copolymer (Y) preferably has a melt flow rate $MFR_2$ of from 0.0001 to 0.1 g/10 min, or a content of comonomer units of from 9.0 to 40.0 mole-%, or both.

Herein in the below text, the definitions of the components of the invention can alternatively be abbreviated in which case the letter (U), (X), (Y), (V), (W) etc. refers to the respective component. E.g. "propylene random copolymer composition (X)" is used also shortly as "propylene copolymer composition (X)" or "copolymer composition (X), and, similarly, the "multimodal propylene copolymer (U)" shortly as "propylene copolymer (U)".

Preferably the propylene copolymer composition (X) and propylene copolymer (Y) are different with respect to comonomer content and/or with respect to $MFR_2$ values, preferably the propylene copolymer composition (X) and propylene copolymer (Y) have at least different $MFR_2$ values, more preferably at least different comonomer content and $MFR_2$ values.

The combination of propylene copolymer composition (X) and propylene copolymer (Y) is advantageous for achieving the comonomer content and the content of the xylene cold soluble (XCS) of the multimodal polypropylene composition of the invention, and thus contributes to the advantageous property balance between Flexural Modulus and Impact properties, as well as to pressure resistance, of the invention.

The propylene copolymer composition (X) preferably comprises at least two propylene polymer components having at least different $MFR_2$ or different comonomer content and selected from propylene homopolymer and propylene copolymer, provided that at least one of the two components is a propylene random copolymer, preferably both of the two propylene polymer components are propylene random copolymers.

Thus preferably the multimodal polymer composition of the invention comprises the multimodal propylene copolymer (U) which comprises the propylene copolymer composition (X) comprising from 30 to 60 wt.-% of a first propylene homopolymer or random copolymer (V) having an $MFR_2$ of from 1.0 to 5.0 g/10 min; and from 40 to 70 wt.-% of a second propylene homopolymer or random copolymer (W), having an $MFR_2$ of from 0.1 to 0.60 g/10 min; provided that at least one of said first propylene homopolymer or random copolymer (V) and said second propylene homopolymer or random copolymer (W) is a propylene random copolymer.

The first propylene homopolymer or random copolymer (V) and the second propylene homopolymer of random copolymer (W) are different with respect to comonomer content and/or with respect to $MFR_2$ values, and preferably the $MFR_2$ of first propylene homopolymer or random copolymer (V) is higher than the $MFR_2$ of the second propylene homopolymer or random copolymer (W), and optionally, and preferably, the $MFR_2$ of the second propylene homopolymer or random copolymer (W) is higher than the $MFR_2$ of propylene copolymer (Y).

A least said second propylene homopolymer or random copolymer (W) is preferably a propylene random copolymer.

More preferably the multimodal polymer composition of the invention comprises the multimodal propylene copolymer (U) which comprises the propylene copolymer composition (X) comprising from 30 to 60 wt.-% of the first propylene random copolymer (V) having an $MFR_2$ of from 1.0 to 5.0 g/10 min, or a content of comonomer units of from 1.0 to 6.0 mole-%, or both; and from 40 to 70 wt.-% of the second propylene random copolymer (W) having an $MFR_2$ of from 0.10 to 0.60 g/10 min, or a content of comonomer units of from 3.0 to 12.0 mole-%, or both.

In below, the preferable MFR properties and comonomer content definitions are given for the preferred first and second propylene random copolymer components (V) and (W), however, the definitions for MFR properties apply equally to the first and second propylene homopolymers (V) and (W), respectively.

The first propylene random copolymer (V) and the second propylene random copolymer (W) are different with respect to comonomer content and/or with respect to $MFR_2$ values, preferably the first propylene random copolymer (V) and the second propylene random copolymer (W) have at least different $MFR_2$ values, more preferably at least different comonomer content and $MFR_2$ values.

Each of the first propylene random copolymer (V), the second propylene random copolymer (W) and the propylene copolymer (Y) have preferably a different $MFR_2$ and/or comonomer content, more preferably at least different $MFR_2$, most preferably different $MFR_2$ and different comonomer content.

Preferably the $MFR_2$ of the propylene copolymer composition (X) is higher than the $MFR_2$ of the propylene copolymer (Y) and/or the comonomer content of the propylene copolymer composition (X) is lower than the comonomer content of the propylene copolymer (Y). More preferably, the $MFR_2$ of the propylene copolymer composition (X) is higher than the $MFR_2$ of the propylene copolymer (Y) and the comonomer content of the propylene copolymer composition (X) is lower than the comonomer content of the propylene copolymer (Y)

More preferably, the $MFR_2$ of the first propylene random copolymer (V) is higher than the $MFR_2$ of the second propylene random copolymer (W) and the $MFR_2$ of the second propylene random copolymer (W) is higher than the $MFR_2$ of the propylene copolymer (Y); and/or the comonomer content of the first propylene random copolymer (V) is lower than the comonomer content of the second propylene random copolymer (W) and the comonomer content of the second propylene random copolymer (W) is lower than the comonomer content of the propylene copolymer (Y).

Even more preferably the $MFR_2$ of the first propylene random copolymer (V) is higher than the $MFR_2$ of the second propylene random copolymer (W) and the $MFR_2$ of the second propylene random copolymer (W) is higher than the $MFR_2$ of the propylene copolymer (Y) and the comonomer content of the first propylene random copolymer (V) is lower than the comonomer content of the second propylene random copolymer (W), and the comonomer content of the second propylene random copolymer (W) is lower than the comonomer content of the propylene copolymer (Y).

The polymer composition (X) may contain a prepolymer fraction. In case of the presence of a prepolymer fraction, said fraction is calculated to the amount (wt.-%) of the propylene copolymer composition (X), more preferably to the amount (wt.-%) of the first propylene random copolymer (V). The prepolymer fraction can be propylene homopolymer or copolymer.

The multimodal polypropylene composition comprises optionally a nucleating agent (Z).

Accordingly, the preferable nucleating agent (Z) can be incorporated to the multimodal polypropylene composition by adding part or all of the preferable nucleating agent (Z) separately (e.g. by well known compounding techniques) to the multimodal propylene copolymer (U). Alternatively, part or all of the preferable nucleating agent (Z) can incorporated to the multimodal polypropylene composition by being present in any or all of the abovementioned polypropylene components of the multimodal propylene copolymer (U), namely in copolymer composition (X), preferably in first propylene copolymer (V) and/or in second propylene random copolymer (W), more preferably in both first and second propylene copolymer (V) and (W); and/or in propylene copolymer (Y), more preferably in first propylene copolymer (V) and in second propylene random copolymer (W) of the propylene copolymer composition (X), as well as in propylene copolymer (Y).

Accordingly, the multimodal polypropylene composition of the invention comprises, preferably consists of, the multimodal propylene copolymer (U), optional, and preferable, nucleating agent (Z) and optional further additives.

Even more preferably, said multimodal propylene copolymer (U) of the multimodal polypropylene composition consists of said propylene copolymer composition (X), said propylene copolymer (Y), said optional, and preferable, nucleating agent (Z) and optional further additives.

Even more preferably, said propylene copolymer composition (X) of said multimodal propylene copolymer (U) of the multimodal polypropylene composition consists of the first propylene random copolymer (V), the second propylene random copolymer (W), said optional, and preferable, nucleating agent (Z) and optional further additives. Additionally preferably, said propylene copolymer (Y) consists of the propylene copolymer (Y) and said optional, and preferable, nucleating agent (Z) and optional further additives.

The amount of the preferable nucleating agent (Z) in the multimodal polypropylene composition, when preferably present, is of 0.1 to 10000 ppm by weight (means parts per million based on the total weight of the multimodal polypropylene composition (100 wt %), preferably based on the combined amount of multimodal propylene copolymer (U) and nucleating agent (Z), also abbreviated herein shortly as ppm). Said amount means the total sum of the amount of nucleating agent (Z) present in the multimodal polypropylene composition. I.e. said amount can be totalling from the amount resulting from the incorporation of the nucleating agent (Z) separately to the propylene copolymer (U) and/or resulting from any amount(s) of the nucleating agent (Z) being originally present in the propylene copolymer (U), i.e. in the propylene copolymer composition (X), preferably in the first propylene random copolymer (V) and/or in the second propylene random copolymer (W), and/or in the propylene copolymer (Y), at time the composition is formed.

It is preferred that the nucleating agent (Z) is present in the multimodal polypropylene composition. It is believed that the nucleating agent (Z) contributes to the advantageous property balance between Flexural Modulus and Impact properties, as well as to pressure resistance, of the invention.

The multimodal propylene copolymer (U) may comprise one, two or more type(s), preferably one or two type(s), most preferably one type, of comonomer(s).

The comonomers of said multimodal propylene copolymer (U) are preferably selected from $C_2$ and $C_4$ to $C_6$ alpha-olefins. A particular preferred comonomer is ethylene.

The polypropylene composition of the present invention is more preferably a multimodal propylene copolymer (U) which is a propylene copolymer with ethylene comonomer.

The FIGURE is a general flow chart illustrating the preferable production process for producing the most preferable multimodal polypropylene composition of the invention and the preferred polypropylene components thereof.

The multimodal polypropylene polymer composition of the invention can also be defined by means of product-by-process definition, which has a well-known meaning in the patent filed.

Accordingly, equally alternatively to above preferable subgroups, the multimodal polypropylene composition comprises a multimodal propylene copolymer (U) containing at least one comonomer selected from alpha-olefins with 2 or 4 to 8 carbon atoms in a total amount of 4.0 to 10.0 mole-% wherein the multimodal polypropylene composition has a melt flow rate $MFR_2$ (2.16 kg, 230° C.) of 0.05 to 1.00 g/10 min determined according to ISO 1133, a content of xylene cold solubles (XCS) of 4.0 to 17.0 wt.-% determined at 25° C. according to ISO 16152, wherein the multimodal polypropylene composition is obtainable by a multistage process, wherein propylene and at least one comonomer selected from alpha-olefins with 2 or 4 to 8 carbon atoms is polymerised in the presence of (I) a solid catalyst component comprising a magnesium halide, a titanium halide and an internal electron donor; and (II) a cocatalyst comprising an aluminium alkyl and optionally an external electron donor; and (III) an optional, nucleating agent (Z), preferably a polymeric nucleating agent (Z), preferably the nucleating agent (Z) is present and is preferably a polymer of a vinyl compound of formula 1 as will be defined below, more preferably a polymer of vinyl cyclohexane and/or 3-methyl-1-butene, even more preferably a polymer of vinyl cyclohexane;

the multistage process comprising the steps of (A) continuously polymerizing propylene, optionally a comonomer selected from the group of ethylene and at least one $C_4$-$C_8$ alpha-olefins, in a first polymerisation stage by introducing streams of propylene, hydrogen and optionally said comonomer into the first polymerisation stage at a temperature of from 60 to 100° C. and a pressure of from 40 to 65 bar to produce a first propylene polymer (V), wherein the first propylene polymer (V) has a melt flow rate $MFR_2$ (2.16 kg, 230° C.; ISO 1133) of from 1.0 to 5.0 g/10 min;

(B) withdrawing from the first polymerisation stage a stream comprising the first propylene polymer (V) and transferring said stream into a second polymerisation stage;

(C) polymerizing propylene in the presence of said first propylene polymer (V) in the second polymerisation stage at a temperature of from 65 to 90° C. and a pressure of from 19 to 25 bar by introducing streams of propylene, hydrogen, and optionally at least one comonomer, to produce a copolymer composition (X) of said first propylene polymer (V) and a second propylene polymer (W); provided that at least one of said first and second polymers (V) and (W) is a propylene random copolymer;
said copolymer composition (X) comprising
from 30 to 60 wt.-% of said first propylene polymer (V) and from 40 to 70 wt.-% of said second propylene polymer (W) with respect to the copolymer composition (X),
wherein the copolymer composition (X) has a melt flow rate $MFR_2$ of 0.25 to 1.0 g/10 min which is lower than the $MFR_2$ of said first polymer (V);

(D) withdrawing a stream comprising the copolymer composition (X) from the second polymerisation stage and transferring said stream into a third polymerisation stage;

(E) polymerizing propylene and at least one comonomer in the presence of the copolymer composition (X) in the third polymerisation stage at a temperature of from 65 to 90° C. and a pressure of from 10 to 100 bar by introducing streams of propylene, hydrogen, and at least one comonomer, to produce the multimodal propylene copolymer (U) comprising the copolymer composition (X) and a further propylene copolymer (Y) component, wherein the multimodal propylene copolymer (U) has a melt flow rate $MFR_2$ of 0.25 to 1.00 g/10 min;

wherein the multimodal propylene copolymer (U) comprises from 75 to 98 wt.-%, preferably from 85 to 95 wt.-%, of said copolymer composition (X) and from 2 to 25 wt.-%, preferably from 5 to 15 wt.-%, of said propylene copolymer (Y); and wherein the comonomer content of the propylene copolymer (Y) is from 9.0 to 40 mole-%;

(F) continuously withdrawing a stream comprising the multimodal propylene copolymer (U) from the third polymerisation stage and optionally mixing the multimodal propylene copolymer (U) with additives; and (G) extruding the multimodal propylene copolymer (U) into pellets.

More preferably, the multimodal polypropylene composition of the invention is obtainable by the multistage process as defined above comprising a further step (AA) preceding step (A), wherein (AA) polymerising a vinyl compound of the formula (1) as defined above or below, preferably vinylcyclohexane (VCH) in the presence of a catalyst system comprising the solid catalyst component (1) to obtain a modified catalyst system which is the reaction mixture comprising the solid catalyst component (1) and the produced polymer of the vinyl compound of formula (1), preferably, and wherein, the weight ratio (g) of the polymer of the vinyl compound of the formula (1) to the solid catalyst component (1) is up to 5 (5:1), preferably up to 3 (3:1) most preferably is from 0.5 (1:2) to 2 (2:1), and the obtained modified catalyst system is fed to polymerisation step (A) of the multistage process for producing the multimodal propylene copolymer (U).

Preferably the multimodal polypropylene composition, more preferably the multimodal propylene copolymer (U) has the following properties. It is to be understood that the below preferable subgroups and/or property ranges can be combined in any order:

a) MFR

The multimodal polypropylene composition, more preferably the propylene copolymer (U), according to the present invention has a melt flow rate $MFR_2$ (2.16 kg, 230° C.) of 0.25 to 1.00 g/10 min, preferably 0.30 to 0.90 g/10 min, more preferably of 0.35 to 0.80 g/10 min determined according to ISO 1133.

XCS content

Furthermore, multimodal polypropylene composition, more preferably the propylene copolymer (U), according to the present invention has a content of xylene cold solubles (XCS) of 4.0 to 17.0 wt.-%, preferably 5.0 to 15.0 wt.-%, and most preferably of 6.0 to 13.5 wt.-% with respect to the weight of the multimodal propylene random copolymer, determined at 25° C. according to ISO 16152.

b) XCU Content

Furthermore, the multimodal polypropylene composition, more preferably the propylene copolymer (U), according to the present invention preferably has a content of cold insolubles (XCU) of 83.0 to 96.0 wt.-%, more preferably 85.0 to 95.0 wt.-%, and most preferably of 86.5 to 94.0 wt.-% with respect to the weight of the multimodal propylene random copolymer, determined at 25° C. according to ISO 16152.

c) Polydispersity Index

The multimodal polypropylene composition, more preferably the propylene copolymer (U), according to the present invention has a polydispersity index (PI) of 2.5 to 4.0 $Pa^{-1}$, preferably of 2.9 to 3.9 $Pa^{-1}$, and most preferably of 3.1 to 3.8 $Pa^{-1}$, determined by rheological measurements as described below in the example section.

d) Crystallization Temperature

Moreover, the multimodal polypropylene composition, more preferably the propylene copolymer (U), according to the present invention preferably has a crystallization temperature $T_C$ of at least 110° C., more preferably of at least 112° C., and most preferably of at least 114° C., determined according to ISO 11357-1, -2, and -3. Generally, the crystallization temperature $T_C$ is not higher than 130° C.

e) Charpy Notched Impact Strength at 0° C.

The multimodal polypropylene composition, more preferably the propylene copolymer (U), according the invention preferably has a Charpy Notched Impact Strength (NIS) at 0° C. of at least 4.0 $kJ/m^2$, more preferably of at least 5.0 $kJ/m^2$, still more preferably at least 6.0 $kJ/m^2$, even more preferably of at least 7.0 $kJ/m^2$ and most preferably of at least 8.0 $kJ/m^2$, determined according to ISO 179/1eA:2000 using notched injection moulded specimens. Generally, the Charpy Notched Impact Strength (NIS) at 0° C. is not higher than 40 $kJ/m^2$.

f) Charpy Notched Impact Strength at 23° C.

The multimodal polypropylene composition, more preferably the propylene copolymer (U), according the invention preferably has a Charpy Notched Impact Strength (NIS) at 23° C. of at least 30 $kJ/m^2$, more preferably of at least 40 $kJ/m^2$, and most preferably at least 50 $kJ/m^2$, determined according to ISO179/1eA: 2000 using notched injection moulded specimens. Generally, the Charpy Notched Impact Strength (NIS) at 23° C. is not higher than 130 $kJ/m^2$.

g) Flexural Modulus

The multimodal polypropylene composition, more preferably the propylene copolymer (U), according to the present invention preferably has a flexural modulus of at least 700 MPa, more preferably of at least 750 MPa, more preferably at least 800 MPa, more preferably at least 830 MPa, determined according to ISO 178 at a test speed of 2 mm/min and a force of 100 N on test specimens having a dimension of 80×10×4.0 $mm^3$ (length×width×thickness) prepared by injection moulding according to EN ISO 1873-2. The upper limit of the flexural modulus usually does not exceed 1400 MPa, and is preferably 1200 MPa or less. The polypropylene composition most preferably has a flexural modulus of 830 to 1100 MPa.

h) Tensile Stress at Yield

The multimodal polypropylene composition, more preferably the propylene copolymer (U), according to the present invention preferably has a tensile stress at yield of at least 20 MPa, more preferably of at least 22 MPa, and most preferably of at least 24 MPa, determined according to ISO 527-2:1996 using type 1A injection moulded test specimens prepared according to ISO 527-2:1996. Generally, the tensile stress at yield is not higher than 40 MPa.

i) Comonomer Content

The at least one comonomer of the multimodal propylene copolymer (U) according to the present invention is selected from alpha-olefins with 2 or 4 to 8 carbon atoms in a total amount of 3.5 to 12.0 mole-%, preferably of 4.0 to 10.0 mole-%, more preferably of 4.5 to 9.0 mole-%, most preferably 5.0 to 9.0 mol-%, based on the total content of monomeric units in the multimodal propylene copolymer (U).

j) Relationship of Crystallization Temperature $T_C$ and Comonomer Content

The multimodal polypropylene composition, more preferably the propylene copolymer (U), according to the present invention preferably has the following relationship between the crystallization temperature $T_C$ and comonomer content: $T_C$×comonomer content of the multimodal propylene copolymer (U) is at least 400° C. mole-%, more preferably of at least 450° C. mole-%, and most preferably of at least 480° C. mole-%, and not higher than 1500° C. mole-%.

k) Copolymer Composition (X) Content of Multimodal Propylene Copolymer (U)

The amount of the preferable propylene copolymer composition (X) in the multimodal propylene copolymer (U) is of 75 to 98%, preferably of 85 to 95 wt.-%, more preferably of 88 to 95 wt.-%.

l) Propylene Copolymer (Y) Content of Multimodal Propylene Copolymer (U)

Furthermore, the amount of the preferable propylene copolymer (Y) in the multimodal propylene copolymer (U) is of 2 to 25%, preferably of 5 to 15 wt.-%, more preferably of 5 to 12 wt.-%.

Furthermore, the multimodal propylene copolymer (U) has more preferably the following properties and/or property ranges:

m) Quotient of the Division of $MFR_{2,U}$ by $MFR_{2,X}$

Preferably, the quotient of the division of $MFR_{2,U}$ by $MFR_{2,X}$ according to the present invention is 0.4 to 0.95, preferably 0.5 to 0.90, and most preferably 0.6 to 0.85.

n) Quotient of the Division of $C_{2,X}$ by $C_{2,U}$

Preferably, the quotient of the division of the comonomer content of the copolymer composition (X), $C_{2,X}$, by the comonomer content of the multimodal propylene copolymer (U), $C_{2,U}$, according to the present invention is 0.50 to 0.96, preferably 0.55 to 0.95, and most preferably 0.60 to 0.90.

o) Preferable Copolymer Composition (X) of Multimodal Propylene Copolymer (U)

i. $MFR_2$ of Copolymer Composition (X)

The copolymer composition (X) according to the present invention has a melt flow rate $MFR_2$ (2.16 kg, 230° C.) of 0.25 to 1.0 g/10 min, 0.3 to 1.0 g/10 min, and most preferably of 0.4 to 0.9 g/10 min, determined according to ISO 1133.

ii. First Propylene Homo or Copolymer (V) Content of Copolymer Composition (X)

The amount of the preferable first propylene homo or copolymer, preferably propylene random copolymer, (V) in the copolymer composition (X) according to the present invention is of 30 to 60 wt.-%, preferably of 33 to 55 wt.-% and most preferably of 40 to 53 wt.-%.

iii. Second Propylene Homo or Copolymer (W) Content of Copolymer Composition (X)

The amount of the preferable second propylene homo or copolymer, preferably propylene random copolymer, (W) in the copolymer composition (X) according to the present invention comprises of 40 to 70 wt.-%, preferably of 45 to 67 wt.-%, and most preferably of 47 to 60 wt.-%.

iv. XCS Content of Copolymer Composition (X)

Furthermore, the copolymer composition (X) according to the present invention has preferably a content of xylene cold solubles (XCS) of 3.0 to 20.0 wt.-%, preferably 4.0 to 15.0 wt.-%, and most preferably of 4 to 7 wt.-% with respect to the weight of the copolymer composition (X), determined at 25° C. according to ISO 16152.

v. Comonomer Content of Copolymer Composition (X)

The comonomer of copolymer composition (X) according to the present invention is selected from at least one of the group consisting of ethylene and alpha-olefins with 4 to 8 carbon atoms in a total amount of 2.0 to 12.0 mole-%, preferably of 2.5 to 10.0 mole-% and most preferably of 4.0 to 6.0 mole-%, based on the total content of monomeric units in the copolymer composition (X).

vi. Quotient of the Division of $MFR_{2,X}$ by $MFR_{2,V}$

Preferably, the quotient of the division of the $MFR_2$ value of the propylene copolymer composition (X) by the $MFR_2$ value of the first propylene random copolymer (V) according to the present invention is 0.20 to 0.80, preferably 0.25 to 0.75, and most preferably 0.30 to 0.70.

vii. Quotient of the Division of the Comonomer Content $C_{2,V}$ by the Comonomer Content $C_{2,X}$ Preferably, the quotient of the division of the comonomer content of the first propylene copolymer (V), $C_{2,V}$, by the comonomer content of the propylene copolymer composition (X), $C_{2,X}$, according to the present invention is 0.50 to 0.98, preferably 0.60 to 0.98, and most preferably 0.70 to 0.98.

p) Preferable First Propylene Homo or Copolymer (V) of Propylene Copolymer Composition (X) of Multimodal Propylene Copolymer (U)

i. $MFR_2$

The first propylene homo or copolymer, preferably propylene random copolymer, (V) according to the present invention has a melt flow rate $MFR_2$ (2.16 kg, 230° C.) of 1.0 to 5.0 g/10 min, preferably 1.0 to 4.0 g/10 min, and most preferably of 1.5 to 3.0 g/10 min, determined according to ISO 1133.

ii. XCS Content

Furthermore, the first propylene homo or copolymer, preferably propylene random copolymer, (V) according to the present invention has a content of xylene cold solubles (XCS) of 1.0 to 20.0 wt.-%, preferably 2.0 to 15.0 wt.-%, and most preferably of 3.0 to 10.0 wt.-% with respect to the weight of the propylene copolymer composition (X), determined at 25° C. according to ISO 16152.

iii. Comonomer Content

The comonomer of the preferred first propylene random copolymer (V) according to the present invention is selected from at least one of the group consisting of ethylene and alpha-olefins with 4 to 8 carbon atoms in a total amount of 0.1 to 6.0 mole-%, preferably of 0.5 to 5.0 mole-%, and most preferably of 2.0 to 5.0 mole-%, based on the total content of monomeric units in the first propylene random copolymer (V).

q) Preferable Second Propylene Homo or Copolymer, Preferably Propylene Random Copolymer, (W) of Propylene Copolymer Composition (X) of Multimodal Propylene Copolymer (U)

i) MFR

The second propylene homo or copolymer, preferably propylene random copolymer, (W) according to the present invention has a melt flow rate $MFR_2$ (2.16 kg, 230° C.) of 0.10 to 0.60 g/10 min, preferably 0.10 to 0.50 g/10 min, and most preferably of 0.20 to 0.40 g/10 min, determined according to ISO 1133.

ii) Comonomer Content

The comonomer of the preferred second propylene random copolymer (W) according to the present invention is selected from at least one of the group consisting of ethylene and alpha-olefins with 4 to 8 carbon atoms in a total amount of 3.0 to 12.0 mole-%, preferably of 3.5 to 10.0 mole-%, and most preferably of 4.0 to 7.0 mole-%, based on the total content of monomeric units in the second propylene random copolymer (W).

r) Preferable Propylene Copolymer (Y) of Multimodal Propylene Copolymer (U)

i) MFR

The propylene copolymer (Y) according to the present invention has a melt flow rate $MFR_2$ (2.16 kg, 230° C.) of 0.0001 to 0.10 g/10 min, preferably 0.001 to 0.08 g/10 min, and most preferably of 0.005 to 0.07 g/10 min, determined according to ISO 1133.

ii) Comonomer Content

The comonomer of the propylene copolymer (Y) according to the present invention is selected from at least one of the group consisting of ethylene and alpha-olefins with 4 to 8 carbon atoms in a total amount of 9 to 40 mole-%, preferably of 10 to 40 mol-%, preferably of 12 to 40 mol-%, more preferably of 12 to 38 mole-%, and most preferably of 12 to 30 mole-%, based on the total content of monomeric units in the propylene copolymer (Y).

The shrinkage of the polypropylene composition after forming the composition into an article, preferably a pipe or a pipe fitting, is preferably not more than 6%, more preferably not more than 5%, most preferably not more than 4%.

Optional and Preferable Nucleating Agent (Z)

As mentioned above, the nucleating agent (Z) is preferably present in the polypropylene composition of the invention and is preferably selected from polymeric nucleating agents, salts of monocarboxylic acids and polycarboxylic acids, for example sodium benzoate;

sorbitol compounds, for instance diacetals of sorbitol or xylitol, for example 1,3:2,4 Bis(3,4-dimethylbenzylidene) sorbitol (CAS-no. 135861-56-2, e.g. Millad 3988, supplier Milliken);

nonitol based nucleating agents, for instance 1,2,3-trideoxy-4,6:5,7-bis-O-((4-propylphenyl) methylene) nonitol (CAS-no. 882073-43-0, e.g. Millad NX8000, supplier Milliken):

phosphorous-based compounds, for instance mono-, bis- or tetra-phenyl phosphates, for example sodium 2,2'-methylene bis-(4,6-di-tert. butylphenyl) phosphate (CAS-no. 85209-91-2, e.g. NA-11, supplier Adeka Corporation) or Hydroxybis (2,4,8,10-tetra-tert. butyl-6-hydroxy-12-H-dibenzo(d,g)(1,3,2) dioxaphosphocin 6-oxidato) aluminium (CAS-no. 151841-65-5, e.g. ADK STAB NA-21, supplier Adeka Corporation), or talc, or any mixtures thereof.

More preferably, the nucleating agent (Z) is different from beta-nucleating agents, which are well known in the art.

It is preferred that said nucleating agent (Z) is a polymeric nucleating agent, preferably a polymerized vinyl compound, more preferably a polymeric nucleating agent obtainable by polymerising vinylcycloalkane monomers or vinylalkane monomers.

The polymeric nucleating agent (Z) is more preferably a polymer of vinyl compound according to the following formula $$CH_2=CH-CHR^1R^2 \quad (1)$$

wherein $R^1$ and $R^2$ together form a 5- or 6-membered saturated, unsaturated or aromatic ring, optionally containing substituents, or independently represent an alkyl group comprising 1 to 4 carbon atoms, whereby in case $R_1$ and $R_2$ form an aromatic ring, the hydrogen atom of the $-CHR_1R_2$ moiety is not present.

Even more preferably, nucleating agent (Z) is selected from: vinyl cycloalkane polymer, preferably vinyl cyclohexane (VCH) polymer, vinyl cyclopentane polymer, 3-methyl-1-butene polymer and vinyl-2-methyl cyclohexane polymer. The most preferred nucleating agent (Z) is vinyl cyclohexane (VCH) polymer.

As mentioned above, in a preferred embodiment, nucleating agent (Z) is a polymeric nucleating agent, more preferably a polymer of vinyl compound according to formula (1) as defined above, even more preferably vinyl cyclohexane (VCH) polymer.

The amount of nucleating agent (Z) preferably is not more than 10000 ppm, more preferably not more than 6000 ppm, even more preferably not more than 5000 ppm, based on the total weight of the multimodal polypropylene composition (100 wt.-%), preferably based on the combined weight of the multimodal propylene copolymer (U) and nucleating agent (Z).

The amount of the nucleating agent (Z) still more preferably is not more than 500 ppm, preferably is from 0.025 to 200 ppm, and more preferably is from 0.1 to 200 ppm, more preferably is from 0.3 to 200 ppm, most preferably is from 0.3 to 100 ppm, based on the total weight of the multimodal polypropylene composition (100 wt.-%), preferably based on the combined weight of the multimodal propylene copolymer (U) and nucleating agent (Z).

In the preferred embodiment the nucleating agent (Z) is a polymeric nucleating agent, most preferably a polymer of vinyl compound according to formula (1) as defined above, even more preferably vinyl cyclohexane (VCH) polymer as defined above, and the amount of said nucleating agent (Z) is not more than 500 ppm, more preferably is from 0.025 to 200 ppm, and more preferably is from 0.1 to 200 ppm, more preferably is from 0.3 to 200 ppm, most preferably is from 0.3 to 100 ppm, based on the total weight of the multimodal polypropylene composition (100 wt.-%), preferably based on the combined weight of the multimodal propylene copolymer (U) and nucleating agent (Z).

The nucleating agent (Z) may be introduced to the multimodal propylene copolymer (U) e.g. during the polymerisation process of the multimodal propylene copolymer (U), preferably during the polymerisation process of propylene copolymer composition (X), i.e. during the polymerisation process of the first and second propylene components (V) and (W) thereof, and, preferably, during the polymerisation process of the propylene copolymer (Y). Alternatively, the nucleating agent (Z) may be incorporated to the multimodal propylene copolymer (U) in the form of masterbatch (MB) together with e.g. a carrier polymer. It is preferred that the nucleating agent (Z) is introduced to the multimodal propylene copolymer (U) during the polymerisation process of the multimodal propylene copolymer (U). The nucleating agent (Z) is most preferably introduced to the multimodal propylene copolymer (U) by first polymerising the above defined vinyl compound according to formula (1) as defined above, even more preferably vinyl cyclohexane (VCH), in the presence of a catalyst system comprising a solid catalyst component, preferably a solid Ziegler Natta catalyst component, a cocatalyst and optional external donor, and the obtained reaction mixture of the polymer of the vinyl compound according to formula (1) as defined above, even more preferably vinyl cyclohexane (VCH) polymer, and the catalyst system is then used for producing the multimodal propylene copolymer (U).

Said obtained reaction mixture is herein below referred interchangeably as modified catalyst system.

Further Optional Additives

Moreover, in addition to the nucleating agent (Z), the propylene composition of the invention may contain further additives suitable for pipe applications, preferably conventional additives for pipe applications including without limiting to, further nucleating agents, clarifiers, brighteners, acid scavengers and antioxidants, as well as slip agents, inorganic filler and UV light stabilizers. Each additive can be used e.g. in conventional amounts, the total amount of additives present in the propylene composition being preferably as defined below. Such additives are generally commercially available and are described, for example, in "Plastic Additives Handbook", 5th edition, 2001 of Hans Zweifel.

The total amount of optional further additives is preferably between 0.0001 and 10 wt.-%, preferably 0.0001 and 5.0 wt.-%, preferably 0.0001 and 2.5 wt.-%, more preferably between 0.0001 and 1.5 wt.-%, still more preferably between 0.0001 and 1.0 wt.-%, based on the total weight of the polypropylene composition (100 wt.-%). In case the nucleating agent (Z) and/or any optional additive(s) is added in an optional masterbatch, then the carrier material, e.g. carrier polymer, of the additive is calculated to the (total) amount of the additive(s), based on the total weight of the polypropylene composition (100 wt.-%), preferably based on the combined weight of the multimodal propylene copolymer (U) and nucleating agent (Z).

It is especially preferred that polypropylene composition according to the invention consists of the multimodal propylene copolymer (U), the nucleating agent (Z) and optional further additives, all as defined above.

Catalyst

The multimodal propylene copolymer (U) can be produced by polymerisation in the presence of any conventional coordination catalyst system including Ziegler-Natta, chromium and single site (like metallocene catalyst), preferably in the presence of a Ziegler-Natta catalyst system. Such Ziegler-Natta catalyst system typically comprises a solid catalyst component, preferably a solid transition metal component, and a cocatalyst, and optionally an external donor. The solid catalyst component comprises most preferably a magnesium halide, a titanium halide and an internal electron donor. Such catalysts are well known in the art.

It is preferred that the nucleating agent (Z) is introduced to the multimodal propylene copolymer (U) during the polymerisation process of the multimodal propylene copolymer (U).

More preferably, a vinyl compound of the formula (1) as defined above or below, preferably vinyl cyclohexane (VCH), is polymerised in the presence of a catalyst system comprising the solid catalyst component, preferably a solid Ziegler Natta catalyst component, to obtain a modified catalyst system which is the reaction mixture comprising the solid catalyst component and the produced polymer of the vinyl compound of formula (1). In the obtained modified catalyst system the weight ratio (g) of the polymer of the vinyl compound of the formula (1) to the solid catalyst component is preferably up to 5 (5:1), preferably up to 3 (3:1) most preferably is from 0.5 (1:2) to 2 (2:1). The obtained modified catalyst system is then used for the polymerisation of the multimodal propylene copolymer (U) of the invention.

The general preparation of modified catalyst system of the invention and the polypropylene nucleated with a vinyl compound (1) is disclosed e.g. in EP 1 028 984.

As to the solid Ziegler Natta catalyst component used for the modification, said catalyst component comprises preferably a transition metal component and a magnesium halide. These compounds may be supported on a particulate support, such as inorganic oxide, like silica or alumina, or, usually, the magnesium halide to form above said solid support. Examples of such solid catalyst components are disclosed, among others, in WO 87/07620, WO 92/21705, WO 93/11165, WO 93/11166, WO 93/19100, 97/36939, WO 98/12234, WO 99/33842.

A Ziegler-Natta type catalyst typically used in the present invention for propylene polymerisation is stereospecific, high yield Ziegler-Natta catalyst comprising as essential components Mg, Ti, Al and Cl. This type of catalysts comprise typically in addition to a solid transition metal (like Ti) component a cocatalyst(s) as well external donor(s) as stereoregulating agent.

These compounds may be supported on a particulate support, such as inorganic oxide, like silica or alumina, or, usually, the magnesium halide may form the solid support. It is also possible that solid catalysts are self-supported, i.e. the catalysts are not supported on an external support, but are prepared via emulsion-solidification method.

The solid catalyst components for polymerising the multimodal propylene copolymer (U) typically comprise, in addition to the magnesium halide and transition metal compound, an electron donor (internal electron donor).

Suitable electron donors are, among others, esters of carboxylic acids, like phthalates, citraconates, and succinates. Also oxygen- or nitrogen-containing silicon compounds may be used. Examples of suitable compounds are shown in WO 92/19659, WO 92/19653, WO 92/19658, U.S. Pat. Nos. 4,347,160, 4,382,019, 4,435,550, 4,465,782, 4,473,660, 4,530,912 and 4,560,671. The cocatalyst used in combination with the transition metal compound typically comprises an aluminium alkyl compound. The aluminium alkyl compound is preferably trialkyl aluminium such as trimethylaluminium, triethylaluminium, tri-isobutyl aluminium or tri-n-octylaluminium. However, it may also be an alkyl aluminium halide, such as diethyl aluminium chloride, dimethylaluminium chloride and ethylaluminium sesquichloride. Triethylaluminium is an especially preferred aluminium alkyl compound. The aluminium alkyl is preferably introduced to reach a desired ratio of the aluminium to titanium. Suitable ratios depend on the catalyst and lie within the range of from 30 to 1000 mol/mol, such as 50 to 600 mol/mol.

Moreover, said solid catalyst components are preferably used in combination with well-known external electron donors, including without limiting to, ethers, ketones, amines, alcohols, phenols, phosphines and silanes, for example organosilane compounds containing Si—OCOR, Si—OR, or Si—NR$_2$ bonds, having silicon as the central atom, and R is an alkyl, alkenyl, aryl, arylalkyl or cycloalkyl with 1-20 carbon atoms; and well known cocatalysts, which preferably comprise an aluminium alkyl compound as known in the art to produce the multimodal propylene copolymer (U). Especially preferred external donors include alkoxysilanes bearing alkyl substituents, such as methylcyclohexyldimethoxysilane and dicyclopentyldimethoxysilane.

When the nucleating agent (Z) is introduced to the multimodal propylene copolymer (U) during the polymerisation process of the multimodal propylene copolymer (U), the amount of nucleating agent (Z) present in the multimodal propylene copolymer (U) is preferably not more than 500 ppm, more preferably is 0.025 to 200 ppm, still more preferably is 1 to 100 ppm, and most preferably is 5 to 100 ppm, based on the total weight of the propylene composition (100 wt.-%), preferably based on the combined weight of the multimodal propylene copolymer (U) and nucleating agent (Z).

General Process

The multimodal polypropylene composition (U) of the invention is preferably produced in a continuous multistage process in a conventional manner. It is to be understood that as soon as the inventors have found the advantageous property balance resulting to the multimodal polypropylene composition (U), then for industrial scale production it is within the skills of a skilled person to adjust process parameters and controls to obtain the properties of the multimodal polypropylene composition (U). The process preferably comprises at least three polymerisation stages.

It should be understood that the process may contain additional polymerisation steps preferably included in the first polymerisation stage. It may contain additional polymerisation steps, such as a prepolymerisation step. Furthermore, any of the three polymerisation stages may comprise two or more polymerisation sub-steps to result to the reaction mixture of the polymer of that stage. In the most preferred embodiment the process consists of three polymerisation stages each comprising a single polymerisation step, whereas the first polymerisation stage may additionally include a prepolymerisation step.

Accordingly, the invention further provides a multistage process for producing the multimodal polypropylene composition as defined above or in claims, wherein propylene and at least one comonomer selected from alpha-olefins with 2 or 4 to 8 carbon atoms is polymerised in the presence of (I) a solid catalyst component comprising a magnesium halide, a titanium halide and an internal electron donor; and (II) a cocatalyst comprising an aluminium alkyl and optionally an external electron donor; and (III) an optional nucleating agent (Z), preferably in the presence of a nucleating agent (Z) as defined above or below;

the multistage process comprising the steps of (A) continuously polymerizing propylene, optionally a comonomer selected from the group of ethylene and at least one $C_4$-$C_8$ alpha-olefins, in a first polymerisation stage by introducing streams of propylene, hydrogen and optionally said comonomer into the first polymerisation stage at a temperature of from 60 to 100° C. and a pressure of from 40 to 65 bar to produce a first propylene polymer (V), wherein the first propylene polymer (V) has a melt flow rate $MFR_2$ (2.16 kg, 230° C.; ISO 1133) of from 1.0 to 5.0 g/10 min;

(B) withdrawing from the first polymerisation stage a stream comprising the first propylene polymer (V) and transferring said stream into a second polymerisation stage;

(C) polymerizing propylene in the presence of said first propylene polymer (V) in the second polymerisation stage at a temperature of from 65 to 90° C. and a pressure of from 19 to 25 bar by introducing streams of propylene, hydrogen, and optionally at least one comonomer, to produce a copolymer composition (X) of said first propylene polymer (V) and a second propylene polymer (W); provided that at least one of said first and second polymers (V) and (W) is a propylene random copolymer;

said copolymer composition (X) comprising from 30 to 60 wt.-% of said first propylene polymer (V) and from 40 to 70 wt.-% of said second propylene polymer (W) with respect to the copolymer composition (X), wherein the copolymer composition (X) has a melt flow rate $MFR_2$ of 0.25 to 1.0 g/10 min which is lower than the $MFR_2$ of said first polymer (V);

(D) withdrawing a stream comprising the copolymer composition (X) from the second polymerisation stage and transferring said stream into a third polymerisation stage;

(E) polymerizing propylene and at least one comonomer in the presence of the copolymer composition (X) in the third polymerisation stage at a temperature of from 65 to 90° C. and a pressure of from 10 to 100 bar by introducing streams of propylene, hydrogen, and at least one comonomer, to produce the multimodal propylene copolymer (U) comprising the copolymer composition (X) and a further propylene copolymer (Y) component, wherein the multimodal propylene copolymer (U) has a melt flow rate $MFR_2$ of 0.25 to 1.00 g/10 min;

wherein the multimodal propylene copolymer (U) comprises from 75 to 98 wt.-%, preferably from 85 to 95 wt.-%, of said copolymer composition (X) and from 2 to 25 wt.-%, preferably from 5 to 15 wt.-%, of said propylene copolymer (Y); and wherein the comonomer content of the propylene copolymer (Y) is from 9.0 to 40 mole-%;

(F) continuously withdrawing a stream comprising the multimodal propylene copolymer (U) from the third polymerisation stage and optionally mixing the multimodal propylene copolymer (U) with additives; and (G) extruding the multimodal propylene copolymer (U) into pellets.

At least the second propylene polymer (W) is preferably a propylene random copolymer.

In the preferred multistage process of the invention propylene and at least one comonomer selected from alpha-olefins with 2 or 4 to 8 carbon atoms is polymerised in the presence of (I) a solid catalyst component comprising a magnesium halide, a titanium halide and an internal electron donor; and (II) a cocatalyst comprising an aluminium alkyl and optionally an external electron donor; and (III) an optional nucleating agent (Z), preferably in the presence of a nucleating agent (Z) as defined above or below;

the multistage process comprising the steps of (A) continuously polymerizing propylene, a comonomer selected from the group of ethylene and at least one $C_4$-$C_8$ alpha-olefins, in a first polymerisation stage by introducing streams of propylene, hydrogen and said comonomer into the first polymerisation stage at a temperature of from 60 to 100° C. and a pressure of from 40 to 65 bar to produce a first propylene copolymer (V), wherein the first propylene random copolymer (V) has a melt flow rate $MFR_2$ (2.16 kg, 230° C.; ISO 1133) of from 1.0 to 5.0 g/10 min;

(B) withdrawing from the first polymerisation stage a stream comprising the first propylene random copolymer (V) and transferring said stream into a second polymerisation stage;

(C) polymerizing propylene in the presence of said first propylene random copolymer (V) in the second polymerisation stage at a temperature of from 65 to 90° C. and a pressure of from 19 to 25 bar by introducing streams of propylene, hydrogen, and at least one comonomer, to produce a copolymer composition (X) of said first propylene random copolymer (V) and a second propylene random copolymer (W), said copolymer composition (X) comprising from 30 to 60 wt.-% of said first propylene random copolymer (V) and from 40 to 70 wt.-% of said second propylene random copolymer (W) with respect to the copolymer composition (X), wherein the copolymer composition (X) has a melt flow rate $MFR_2$ of 0.25 to 1.0 g/10 min which is lower than the $MFR_2$ of said first polymer (V);

(D) withdrawing a stream comprising the copolymer composition (X) from the second polymerisation stage and transferring said stream into a third polymerisation stage;

(E) polymerizing propylene and at least one comonomer in the presence of the copolymer composition (X) in the third polymerisation stage at a temperature of from 65 to 90° C. and a pressure of from 10 to 100 bar by introducing streams of propylene, hydrogen, and at least one comonomer, to produce the multimodal propylene copolymer (U) comprising the copolymer composition (X) and a further propylene copolymer (Y) component, wherein the multimodal propylene copolymer (U) has a melt flow rate $MFR_2$ of 0.25 to 1.00 g/10 min;

wherein the multimodal propylene copolymer (U) comprises from 75 to 98 wt.-%, preferably from 85 to 95 wt.-%, of said copolymer composition (X) and from 2 to 25 wt.-%, preferably from 5 to 15 wt.-%, of said propylene copolymer (Y); and wherein the comonomer content of the propylene copolymer (Y) is from 9.0 to 40 mole-%;

(F) continuously withdrawing a stream comprising the multimodal propylene copolymer (U) from the third polymerisation stage and optionally mixing the multimodal propylene copolymer (U) with additives; and (G) extruding the multimodal propylene copolymer (U) into pellets.

It is further preferred that the multistage process according to the present invention comprises the following process step preceding step (A):

(AA) polymerising a vinyl compound of the formula (1) as defined above or below, preferably vinylcyclohexane (VCH) in the presence of a catalyst system comprising the solid catalyst component (1) to obtain a modified catalyst system which is the reaction mixture comprising the solid catalyst component (1) and the produced polymer of the vinyl compound of formula (1), preferably, and wherein, the weight ratio (g) of the polymer of the vinyl compound of the formula (1) to the solid catalyst component (1) is up to 5 (5:1), preferably up to 3 (3:1) most preferably is from 0.5 (1:2) to 2 (2:1), and the obtained modified catalyst system is fed to polymerisation step (A) of the multistage process for producing the multimodal propylene copolymer (U).

The multistage process of the invention is described in further details below with reference to the production of the preferred first propylene random copolymer (V) and the second propylene random copolymer (W), however, without limiting thereto. Accordingly, the below description gives the general principles of the process of the invention and can be adapted to the preparation of the optional propylene homopolymer as one of the first and second propylene polymers (V) and (W):

a) Prepolymerisation Step

In a preferred embodiment, the prepolymerisation step is conducted in a continuous manner as bulk slurry polymerisation in liquid propylene, i.e. the liquid phase mainly comprises propylene, with minor amount of other reactants and optionally inert components dissolved therein. Preferably the prepolymerisation step is conducted in a continuous stirred tank reactor or a loop reactor. The prepolymerisation reaction is typically conducted at a temperature of 0 to 60° C., preferably from 10 to 50° C. The pressure in the prepolymerisation reactor is not critical but must be sufficiently high to maintain the reaction mixture in liquid phase. Thus, the pressure may be from 20 to 100 bar, for example 30 to 70 bar. The reaction conditions are well known in the art as disclosed, among others, in GB 1 580 635. It is further possible to feed comonomers into the prepolymerisation step. Examples of suitable comonomers are ethylene or alpha-olefins having from 4 to 10 carbon atoms. Especially suitable comonomers are ethylene, 1-butene, 1-hexene, 1-octene or their mixtures. The amount of polymer produced in the prepolymerisation step does not exceed 5 wt.-% of the amount of the total polymer, preferably it does not exceed 3 wt.-% of the amount of the total polymer and in particular it does not exceed 2 wt.-% or even 1 wt.-% of the amount of the total polymer produced in all the polymerisation stages.

b) First Polymerisation Stage

In the first polymerisation stage the first propylene random copolymer (V) is produced. This is done by introducing a polymerisation catalyst, preferably through the prepolymerisation step as disclosed above, into the first polymerisation stage together with monomer mixture containing propylene and optionally a comonomer selected from ethylene and alpha-olefins containing 4 to 10 carbon atoms.

The content of the comonomer, if present, is controlled to obtain a desired comonomer content in the first propylene random copolymer (V) as defined above or in claims.

The first propylene random copolymer (V) has preferably an $MFR_2$ as defined above or in claims.

As indicated by the comonomer content, the first propylene random copolymer (V) is semicrystalline and not amorphous (i.e. no elastomeric phase is present). The fraction of xylene cold soluble polymer at 25° C. in the first propylene random copolymer (V) is as defined above or in claims.

The polymerisation in the first polymerisation stage is preferably conducted in slurry in a loop reactor. Then the polymer particles formed in the polymerisation, together with the catalyst fragmented and dispersed within the particles, are suspended in a fluid hydrocarbon. The slurry is agitated to enable the transfer of reactants from the fluid into the particles. In loop reactors the slurry is circulated with a high velocity along a closed pipe by using a circulation pump. Loop reactors are well known in the art and examples are given, for instance, in U.S. Pat. Nos. 4,582,816, 3,405, 109, 3,324,093, EP 479 186 and U.S. Pat. No. 5,391,654. Slurry polymerisation is preferably a so called bulk polymerisation. By "bulk polymerisation" is meant a process where the polymerisation is conducted in a liquid monomer essentially in the absence of an inert diluent. However, as it is known to a person skilled in the art the monomers used in commercial production are never pure but always contain aliphatic hydrocarbons as impurities. For instance, the propylene monomer may contain up to 5 wt.-% of propane as an impurity. As propylene is consumed in the reaction and also recycled from the reaction effluent back to the polymerisation, the inert components tend to accumulate, and thus the reaction medium may comprise up to 40 wt.-% of other compounds than monomer. It is to be understood, however, that such a polymerisation process is still within the meaning of "bulk polymerisation", as defined above.

The temperature in the slurry polymerisation is typically from 60 to 100° C., preferably from 60 to 75° C. and in particular from 65 to 72° C. The pressure is from 10 to 100 bar, preferably from 25 to 80 bar, and most preferably from 40 to 65 bar. The pressure is normally selected so that it is higher than the vapour pressure of the fluid reaction mixture at the selected operation temperature. Hydrogen is usually introduced into the reactor for controlling the molecular weight, or the $MFR_2$, of the first polymer. Typically hydrogen is introduced to maintain a constant molar ratio of hydrogen to propylene within the reactor. It has been found for certain catalysts that when the ratio of hydrogen to propylene is within the range of from 0.1 to 4.0 mol/kmol (or, mol/1000 mol), preferably from 0.3 to 3.0 mol/kmol, and most preferably from 0.4 to 2.5 mol/kmol, the $MFR_2$ of the first polymer is within the preferred limits required for the present invention.

Comonomer is introduced to reach the desired content of comonomer units in the polymer. The actual amount of the comonomer is preferably within the range of from 1.0 to 30.0 mol/kmol, preferably from 3.0 to 10.0 mol/kmol, and most preferably from 5.0 to 8.5 mol/kmol. The slurry may be withdrawn from the reactor either continuously or intermittently. A preferred way of intermittent withdrawal is the use of settling legs where the solids concentration of the slurry is allowed to increase before withdrawing a batch of the concentrated slurry from the reactor. The use of settling legs is disclosed, among others, in U.S. Pat. Nos. 3,374,211, 3,242,150 and EP 1 310 295. Continuous withdrawal is disclosed, among others, in EP 891 990, EP 1 415 999, EP 1 591 460 and EP 1 860 125. The continuous withdrawal may be combined with a suitable concentration method, as disclosed in EP 1 860 125 and EP 1 591 460.

Into the first polymerisation stage other components are also introduced as it is known in the art. Process additives, such as antistatic agent, may be introduced into the reactor to facilitate a stable operation of the process.

According to a preferred embodiment of the present invention the slurry is conducted directly into a subsequent second polymerisation stage. By "directly" it is meant that the slurry is introduced from the first into the second polymerisation stage without a flash step between the both polymerisation stages for removing at least a part of the reaction mixture from the polymer. This kind of direct feed is described in EP 887 379, EP 887 380, EP 887 381 and EP 991 684. There is thus no separation step between the stages. However, it is within the scope of the present invention to take small samples or sample streams from the polymer or from the fluid phase or from both for analysing the polymer and/or the composition of the reaction mixture.

Second Polymerisation Stage

In the second polymerisation stage the propylene copolymer composition (X) comprising the first propylene random copolymer (V) and the second propylene random copolymer (W) is formed. This is done by introducing the particles of the first propylene random copolymer (V), containing active catalyst dispersed therein, together with additional propylene and optionally comonomer into the second polymerisation stage. Hydrogen is introduced for controlling the molecular weight. This causes the second propylene random copolymer (W) to form on the particles containing the first propylene random copolymer (V).

The $MFR_2$ of the propylene copolymer composition (X) is as defined above or in claims. Furthermore, the $MFR_2$ of the propylene copolymer composition (X) is lower than the $MFR_2$ of the first propylene random copolymer (V). Preferably, the ratio of the $MFR_2$ of the propylene copolymer composition (X) to the $MFR_2$ of the first propylene random copolymer (V), $MFR_{2,X}/MFR_{2,V}$, has a value of 0.20 to 0.80. As it is well known in the art, the $MFR_2$ of the second propylene random copolymer (W) produced in the second polymerisation stage cannot be directly measured because the second propylene random copolymer (W) cannot be isolated from the propylene copolymer composition (X). However, by knowing the weight fractions of the polymer and the melt indices of the first propylene random copolymer (V) and the propylene copolymer composition (X) it is possible to calculate the $MFR_2$ of the second propylene random copolymer (W). This can be done by using the equation 2:

$$MI_b = (w_1 \cdot MI_1^{-0.0965} + w_2 \cdot MI_1^{-0.0965})^{\frac{1}{0.0965}} \quad (2)$$

where w is the weight fraction of the component in the mixture, MI is the $MFR_2$ and subscripts b, 1 and 2 refer to the mixture, component 1 and component 2, respectively. By calculating the $MFR_2$ of the second propylene random copolymer (W) is as defined above or in claims.

The comonomer is selected from ethylene and alpha-olefins containing 4 to 8 carbon atoms. The comonomer used in the second polymerisation stage may be the same as or different from the comonomer used in the first polymerisation stage. Preferably the same comonomer is used in the first and the second polymerisation stages. The content of the comonomer in the second polymerisation stage is controlled to obtain the desired comonomer content of the propylene copolymer composition (X). Typically the propylene copolymer composition (X) contains units derived from the comonomer and propylene units as defined above or in claims. Furthermore, the comonomer content of the propylene copolymer composition (X) is higher than the comonomer content of the first propylene random copolymer (V). Preferably the ratio of the comonomer content of the first propylene random copolymer (V) to the comonomer content of the propylene copolymer composition (X) (both expressed in mole-%), $C_V/C_X$, is 0.50 to 0.98.

The comonomer content of the second propylene random copolymer (W) cannot be directly measured. However, by using the standard mixing rule it can be calculated from the comonomer contents of the propylene copolymer composition (X) and the first propylene random copolymer (V).

$$C_b = w_1 \cdot C_1 + w_2 \cdot C_2 \quad (3)$$

where C is the content of comonomer in wt.-%, w is the weight fraction of the component in the mixture and subscripts b, 1 and 2 refer to the overall mixture, component 1 and component 2, respectively.

The second propylene random copolymer (W) can then be found to contain units derived from the comonomer and propylene units as defined above or in claims. As it is well known to the person skilled in the art, the comonomer content in weight basis in a binary copolymer can be converted to the comonomer content in mole basis by using the following equation 4:

$$c_m = \frac{1}{1 + \left(\frac{1}{c_w} - 1\right)\frac{MW_c}{MW_m}} \quad (4)$$

where $c_m$ is the mole fraction of comonomer units in the copolymer, $c_w$ is the weight fraction of comonomer units in the copolymer, $MW_c$ is the molecular weight of the comonomer (such as ethylene) and $MW_m$ is the molecular weight of the main monomer (i.e., propylene). As indicated by the comonomer content the second propylene random copolymer (W) is semicrystalline and not amorphous (i.e. no elastomeric phase is present).

The fraction of xylene soluble polymer at 25° C. in the propylene copolymer composition (X) amounts as defined above or in claims.

The content of the xylene soluble polymer in the second propylene random copolymer (W) cannot be directly measured. The amount can be estimated, however, by using the standard mixing rule:

$$XS_b = w_1 \cdot XS_1 + w_2 \cdot XS_2 \quad (5)$$

where XS is the content of xylene soluble polymer in wt.-%, w is the weight fraction of the component in the mixture and subscripts b, 1 and 2 refer to the overall mixture, component 1 and component 2, respectively. The second propylene random copolymer (W) typically can be found to have a content of xylene soluble polymer as defined above or in claims. The propylene copolymer composition (X) comprises from 30 to 60 wt.-% of the first propylene random copolymer (V) and from 40 to 70 wt.-% of the second propylene random copolymer (W). The propylene copolymer composition (X) is semicrystalline and not amorphous (i.e. no elastomeric phase is present).

The second polymerisation stage is preferably conducted in a fluidized bed gas phase reactor. It is often necessary to introduce additional hydrogen into the second polymerisation stage to control the MFR of the propylene copolymer composition. Suitably, the hydrogen feed is controlled to maintain constant hydrogen to propylene ratio in the fluidization gas. The actual ratio depends on the catalyst. Good results have been obtained by maintaining the ratio within the range of from 0.1 to 4 mol/kmol. Even though the actual comonomer to monomer ratio depends on the type of the comonomer and the type of the catalyst used in the process the composition of the monomer and comonomer feeds is suitably adjusted so that the fluidization gas has preferably a ratio of comonomer to propylene of about 10 to 100 mol/kmol (or, mol/1000 mol), preferably from 15 to 70 mol/kmol, and most preferably of 25 to 40 mol/kmol. Such ratios have been found to yield good results for some catalysts.

In a fluidized bed gas phase reactor olefins are polymerised in the presence of a polymerisation catalyst in an upwards moving gas stream. The reactor typically contains a fluidized bed comprising the growing polymer particles containing the active catalyst, said fluidized bed having its base above a fluidization grid and an upper level within the gas phase reactor. The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP 684 871. One or more of the above-mentioned components are typically continuously added into the fluidization gas to compensate for losses caused, among other, by reaction or product withdrawal.

From the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO 2005/087361. Other types of fluidization grids are disclosed, among others, in U.S. Pat. No. 4,578,879, EP 600 414 and EP 721 798. An overview is given in Geldart and Bayens: The Design of Distributors for Gas-fluidized Beds, Powder Technology, Vol. 42, 1985. The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the transport velocity, as otherwise the whole bed would be entrained with the fluidization gas. The bed voidage is typically less than 0.8, preferably less than 0.75 and more preferably less than 0.7. Generally the bed voidage is at least 0.6. An overview is given, among others in Geldart: Gas Fluidization Technology, J. Wiley & Sons, 1986 in chapters 2.4 and 2.5 (pages 17-18) as well as in chapters 7.3 to 7.5 (pages 169-186, especially FIG. 7.21 on page 183). When the fluidization gas is contacted with the bed containing the active catalyst the reactive components of the gas, such as monomers and chain transfer agents, react in the presence of the catalyst to produce the polymer product. At the same time the gas is heated by the reaction heat. The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO 2007/025640, U.S. Pat. No. 4,543,399, EP 699 213 and WO 94/25495. It is also possible to add condensing agents into the recycle gas stream, as disclosed in EP 696 293. The condensing agents are non-polymerisable components, such as n-pentane, isopentane, n-butane or isobutane, which are at least partially condensed in the cooler. The gas is then compressed and recycled into the inlet chamber of the reactor. Prior to the entry into the reactor fresh reactants are introduced into the fluidization gas stream to compensate for the losses caused by the reaction and product withdrawal. It is generally known to analyse the composition of the fluidization gas and introduce the gas components to keep the composition constant. The actual composition is determined by the desired properties of the product and the catalyst used in the polymerisation.

The polymeric product may be withdrawn from the gas phase reactor either continuously or intermittently. Combinations of these methods may also be used. Continuous withdrawal is disclosed, among others, in WO 00/29452. Intermittent withdrawal is disclosed, among others, in U.S. Pat. No. 4,621,952, EP 188 125, EP 250 169 and EP 579 426. The top part of the gas phase reactor may include a so called disengagement zone. In such a zone the diameter of the reactor is increased to reduce the gas velocity and allow the particles that are carried from the bed with the fluidization gas to settle back to the bed. The bed level, i.e., the upper level, may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP 560 035. They are usually polar compounds and include, among others, water, ketones, aldehydes and alcohols. The reactor may also include a mechanical agitator to further facilitate mixing within the fluidized bed. An example of suitable agitator design is given in EP 707 513.

The fluidized bed polymerisation reactor is operated at a temperature within the range of from 60 to 100° C., preferably from 65 to 90° C., and most preferably from 75 to 85°

C. The pressure is suitably from 10 to 100 bar, preferably from 15 to 30 bar, and most preferably from 19 to 25 bar.

c) Third Polymerisation Stage

In the third polymerisation stage the multimodal propylene copolymer (U) comprising the propylene copolymer composition (X) and a propylene copolymer (Y) is formed. This is done by introducing the particles of the propylene copolymer composition (X), containing active catalyst dispersed therein, together with additional propylene and a comonomer into the third polymerisation stage. Hydrogen may be introduced for controlling the molecular weight. This causes the propylene copolymer (Y) to form on the particles containing the propylene copolymer composition (X).

The $MFR_2$ of the multimodal propylene copolymer (U) is as defined above or in claims. The MFR of the multimodal propylene copolymer (U) is lower than the MFR of the propylene copolymer composition (X). Preferably, the ratio of the $MFR_2$ of the multimodal propylene copolymer (U) to the $MFR_2$ of the propylene copolymer composition (X) is at most 0.95. Typically the ratio is not less than 0.4.

As explained above for the propylene copolymer composition (X), the $MFR_2$ of the propylene copolymer (Y) cannot be measured, because the propylene copolymer (Y) cannot be isolated from the multimodal propylene copolymer (U). However, the $MFR_2$ of the propylene copolymer (Y) can be calculated by using equation 2 above. In that case the component 1 is the propylene copolymer composition (X), component 2 is the propylene copolymer (Y) and the final blend is the multimodal propylene copolymer (U). It can then be found that $MFR_2$ of the propylene copolymer (Y) is as defined above or in claims. Accordingly, the comonomer content of the propylene copolymer (Y) can calculated by using equation 3.

Hydrogen feed is adjusted to achieve a desired melt flow rate (or molecular weight) of the polymer. Suitably, the hydrogen feed is controlled to maintain constant hydrogen to propylene ratio in the reaction mixture. The actual ratio depends on the catalyst as well as the type of the polymerisation. Good results have been obtained in gas phase polymerisation by maintaining the ratio within the range of from 0.1 to 3.0 mol/kmol, preferably from 0.2 to 2.0 mol/kmol, and most preferably from 0.3 to 1.5 mol/kmol.

The comonomer is selected from ethylene and alpha-olefins containing 4 to 8 carbon atoms. The comonomer used in the third polymerisation stage may be the same as or different from the comonomer used in the preceding polymerisation stages. Preferably the same comonomer is used in all polymerisation stages. Ethylene is very suitably used as the comonomer. The content of the comonomer in the third polymerisation stage is controlled to obtain the desired comonomer content of the multimodal propylene copolymer (U). Typically the multimodal propylene copolymer (U) contains units derived from the comonomer and propylene units as defined above or in claims. The content of comonomer units in the multimodal propylene copolymer (U) is greater than the content of the comonomer units in the propylene copolymer composition (X). Preferably the ratio of the content of comonomer units in the propylene copolymer composition (X) to the content of the comonomer units in the multimodal propylene copolymer (U), $C_X/C_U$, where both $C_X$ and $C_U$ are expressed in mole-%, is 0.50 to 0.96.

As discussed above for the propylene copolymer composition (X) the comonomer content of the propylene copolymer (Y) cannot be directly measured. Instead, it can be calculated by using equation 3 above. In that case the component 1 is the propylene copolymer composition (X), component 2 is the propylene polymer (Y) and the final blend is the multimodal propylene copolymer (U). The content of the comonomer units in the propylene copolymer (Y) is as defined above or in claims. The molar ratio of commoner to propylene is preferably of 50 to 500 mol/kmol, preferably from 100 to 350 mol/kmol, and most preferably from 150 to 300 mol/kmol. The multimodal propylene copolymer (U) comprises the propylene copolymer composition (X), and the propylene copolymer (Y) as defined above or in claims. The third polymerisation stage is preferably conducted in a fluidized bed gas phase reactor as described above.

The third stage is operated at a temperature within the range of from 60 to 100° C., preferably from 65 to 90° C., and most preferably from 75 to 85° C. The pressure is suitably from 10 to 100 bar, preferably from 15 to 30 bar, and most preferably from 19 to 25 bar.

Extrusion:

When the polymer has been removed from the last polymerisation stage, it is preferably subjected to process steps for removing the residual hydrocarbons from the polymer. Such processes are well known in the art and can include pressure reduction steps, purging steps, stripping steps, extraction steps and so on. Also combinations of different steps are possible. After the removal of residual hydrocarbons the second propylene copolymer composition is preferably mixed with additives as it is well known in the art. Such additives include antioxidants, process stabilizers, neutralisers, lubricating agents, nucleating agents, pigments and so on. The polymer particles are then extruded to pellets as it is known in the art. Preferably co-rotating twin screw extruder is used for the extrusion step. Such extruders are manufactured, for instance, by Coperion (Werner & Pfleiderer) and Japan Steel Works.

Article of the Invention:

Further, the present invention relates to an article comprising the multimodal polypropylene composition according to the present invention.

In a preferred embodiment, the article is selected from a moulded article, which is preferably an injection moulded or blow moulded article, most preferably an injection moulded article, an extruded article, which is preferably a pipe, comprising the multimodal polypropylene composition of the invention. The moulded article can be for any moulding applications including package materials like containers, household articles, thermoformable articles, articles for industrial use etc. which are well known in the field. Preferred article of the invention is a moulded article, particularly an injection moulded article, more preferably said IM article is a fitting for pipe applications.

The moulded article of the invention, like fitting for a pipe, comprises, preferably consists of, the multimodal polypropylene composition of the invention.

The pipe of the invention comprises at least one layer comprising, preferably consisting of, the multimodal polypropylene composition of the invention.

Production of a Moulded Article of the Invention:

The moulded article of the invention can be produced from the multimodal polypropylene composition according to the present invention using the methods and equipment known in the art. Thus, according to one preferred method the multimodal polypropylene composition is moulded, preferably injection moulded or blown moulded, more preferably injection moulded, in a conventional manner using conventional moulding equipment, to a shape of a desired article, preferably fitting for a pipe.

Production of Pipe of the Invention:

Pipes can be produced from the multimodal polypropylene composition according to the present invention according to the methods known in the art. Thus, according to one preferred method the multimodal polypropylene composition is extruded through an annular die to a desired internal diameter, after which the multimodal polypropylene composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube.

According to another method the extrudate leaving the die is directed into a tube having a perforated section in the centre. A slight vacuum is drawn through the perforation to hold the pipe against the walls of the sizing chamber.

After the sizing the pipe is cooled, typically in a water bath having a length of about 5 metres or more.

Determination Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene at a temperature 230° C. and a load of 2.16 kg.

The melt index $MFR_2$ is herein assumed to follow the following mixing rule (equation 1):

$$MI_b = (w_1 \cdot MI_1^{-0.0965} + w_2 \cdot MI_2^{-0.0965})^{\frac{1}{-0.0965}} \quad \text{(eq. 1)}$$

Where w is the weight fraction of the component in the mixture, MI is the melt index $MFR_2$ and subscripts b, 1 and 2 refer to the mixture, component 1 and component 2, respectively.

b) Density

Density of the polymer was measured according to ISO 1183-1:2004 Method A on compression moulded specimen prepared according to EN ISO 1872-2(February 2007) and is given in kg/m.

c) Comonomer Content

The comonomer content was determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of between 100-500 micrmeter and spectra recorded in transmission mode.

Specifically, the ethylene content of a polypropylene-co-ethylene copolymer is determined using the baseline corrected peak area of the quantitative bands found at 720-722 and 730-733 $cm^{-1}$. Specifically, the butene or hexene content of a polypropylene copolymer is determined using the baseline corrected peak area of the quantitative bands found at 1377-1379 $cm^{-1}$. Quantitative results are obtained based upon reference to the film thickness.

The comonomer content is herein assumed to follow the mixing rule (equation 2):

$$C_b = w_1 \cdot C_1 + w_2 \cdot C_2 \quad \text{(eq. 2)}$$

Where C is the content of comonomer in weight-%, w is the weight fraction of the component in the mixture and subscripts b, 1 and 2 refer to the overall mixture, component 1 and component 2, respectively.

As it is well known to the person skilled in the art the comonomer content in weight basis in a binary copolymer can be converted to the comonomer content in mole basis by using the following equation $$c_m = \frac{1}{1 + \left(\frac{1}{c_w} - 1\right) \cdot \frac{MW_c}{MW_m}} \quad \text{(eq. 3)}$$

where $c_m$ is the mole fraction of comonomer units in the copolymer, $c_w$ is the weight fraction of comonomer units in the copolymer, $MW_c$ is the molecular weight of the comonomer (such as ethylene) and $MW_m$ is the molecular weight of the main monomer (i.e., propylene).

d) Xylene Cold Solubles

Xylene cold solubles (XCS, wt.-%) content was determined at 25° C. according ISO 16152; first edition; 2005-Jul. 1, 2005.

The content of xylene soluble polymer is herein assumed to follow the mixing rule (equation 4):

$$XS_b = w_1 \cdot XS_1 + w_2 \cdot XS_2 \quad \text{(eq. 4)}$$

Where XS is the content of xylene soluble polymer in weight-%, w is the weight fraction of the component in the mixture and subscripts b, 1 and 2 refer to the overall mixture, component 1 and component 2, respectively.

e) Flexural Modulus

The flexural modulus was determined according to ISO 178. The test specimens having a dimension of 80×10× 4.0 $mm^3$ (length×width×thickness) were prepared by injection moulding according to EN ISO 1873-2. The length of the span between the supports was 64 mm, the test speed was 2 mm/min and the force was 100 N.

f) Tensile Stress at Yield, Tensile Strain at Yield

Tensile stress at yield and tensile strain at yield was determined according to ISO 527-1:1996 and ISO 527-2:1996 on test specimen ISO 527-2:1996 type 1A moulded specimen, the Injection moulding carried out according to ISO 1873-2:2007.

g) Charpy Notched Impact Strength

Charpy notched impact strength (Charpy NIS) was determined according to ISO 179-1:2000 on notched specimen of 80×10×4 mm, cut from test specimen ISO 527-2:1996 type 1A. Notched impact specimen according to ISO 179-1/1eA:2000 was used. Testing temperature is 23±2° C. for Charpy NIS at 23° C. and 0±2° C. for Charpy NIS at 0° C. Injection moulding carried out according to ISO 1873-2:2007.

h) Crystallization Temperature, Melting Temperature

The crystallization temperature $T_C$ and the melting temperature $T_m$ were measured with a Mettler TA820 differential scanning calorimetry device (DSC) on 3±0.5 mg samples according to ISO 11357-3:1999. Crystallization temperature was obtained during 10° C./min cooling and heating scans between 30° C. and 225° C.

The crystallization temperatures were taken as the peaks of the exotherms of said peaks.

The melting temperatures were taken as the peaks of endotherms.

i) Molecular Weight Distribution MWD, Mw, Mn and Mz

The weight average molecular weight Mw and the molecular weight distribution (MWD=Mw/Mn wherein Mn is the number average molecular 10 weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 15 2,6-Di tert butyl-4-methyl-phenol) as solvent at 145° C. and at a constant flow rate of 1 ml/min. 216.5 µl of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. 20 All samples were prepared by dissolving 5-10 mg of polymer in 10 ml (at 160° C.) of stabilized TCB (same as mobile phase) and keeping for 3 hours with continuous shaking prior sampling in into the GPC instrument.

In case of PP the constants are: K: $19 \times 10^{-3}$ ml/g and a: 0.725 for PP.

j) Rheological Parameters, Polydispersity Index

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (6)$$

If the applied strain is within the linear viscoelastic regime, the resulting sinusoidal stress response can be given by $$\sigma(t) = \sigma_0 \sin(\omega t + \delta) \quad (7)$$

where $\sigma_0$ and $\gamma_0$ are the stress and strain amplitudes, respectively; co is the angular frequency; $\delta$ is the phase shift (loss angle between applied strain and stress response); t is the time.

Dynamic test results are typically expressed by means of several different rheological functions, namely the shear storage modulus G', the shear loss modulus, G", the complex shear modulus, G*, the complex shear viscosity, η*, the dynamic shear viscosity, η', the out-of-phase component of the complex shear viscosity η" and the loss tangent, tan q which can be expressed as follows:

$$G' = \frac{\sigma_0}{\gamma_0} \cos\delta \, [\text{Pa}] \quad (8)$$

$$G' = \frac{\sigma_0}{\gamma_0} \sin\delta \, [\text{Pa}] \quad (9)$$

$$G* = G' + iG \, [\text{Pa}] \quad (10)$$

$$\eta* = \eta' - i\eta'' \, [\text{Pa} \cdot s] \quad (11)$$

$$\eta' = \frac{G''}{\omega} \, [\text{Pa} \cdot s] \quad (12)$$

$$\eta'' = \frac{G''}{\omega} \, [\text{Pa} \cdot s] \quad (13)$$

The values of storage modulus (G'), loss modulus (G"), complex modulus (G*) and complex viscosity (η*) were obtained as a function of frequency (ω). Thereby, e.g. $\eta^*_{300 \, rad/s}$ ($eta^*_{300 \, rad/s}$) is used as abbreviation for the complex viscosity at the frequency of 300 rad/s and $\eta^*_{0.05 \, rad/s}$ ($eta^*_{0.05 \, rad/s}$) is used as abbreviation for the complex viscosity at the frequency of 0.05 rad/s.

The loss tangent tan (delta) is defined as the ratio of the loss modulus (G") and the storage modulus (G') at a given frequency. Thereby, e.g. $\tan_{0.05}$ is used as abbreviation for the ratio of the loss modulus (G") and the storage modulus (G') at 0.05 rad/s and $\tan_{300}$ is used as abbreviation for the ratio of the loss modulus (G") and the storage modulus (G') at 300 rad/s.

The elasticity balance $\tan_{0.05}/\tan_{300}$ is defined as the ratio of the loss tangent $\tan_{0.05}$ and the loss tangent $\tan_{300}$.

The polydispersity index, PI, is defined by equation 14.

$$PI = \frac{10^5}{G'(\omega_{COP})}, \omega_{COP} = \omega \text{ for } (G' = G'') \quad (14)$$

where, $\omega_{COP}$ is the cross-over angular frequency, determined as the angular frequency for which the storage modulus, G' equals the loss modulus, G".

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "-Interpolate y-values to x-values from parameter" and the "logarithmic interpolation type" were applied.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362

[2] The influence of molecular structure on some rheological properties of polyethylene", Heino, E. L., *Borealis* Polymers Oy, Porvoo, Finland, Annual Transactions of the Nordic Rheology Society, 1995).

[3] Definition of terms relating to the non-ultimate mechanical properties of polymers, Pure & Appl. Chem., Vol. 70, No. 3, pp. 701-754, 1998.

k) Pipe Pressure Test

Pressure test performance was measured according to ISO 1167. In this test, a specimen is exposed to constant circumferential (hoop) stress of 16 MPa at elevated temperature of 20° C. in water-in-water or 4.9 MPa at a temperature of 95° C. in water-in-water. The time in hours to failure is recorded. The tests were performed on pipes produced on conventional pipe extrusion equipment, the pipes having a diameter of 32 mm and a wall thickness of 3 mm.

l) Falling Weight Impact Testing at 0°

The measurement was performed in accordance of EN744-1995 where a specific falling height, temperature, striker type and weight were used.

Conditioning Temperature: 0° C.; Conditioning Period: 60 min; Conditioning: in air; Striker: d25; Weight: 0.25 kg; Falling height: 100 cm The failure type was recorded.

m) Charpy Impact at 0° C. C Measurement from Samples Prepared from Test Pipes According ISO9854-1 and 2:1994

Test specimen are prepared out of the pipe. Test specimen dimension 120×15 mm. The criteria in the application standard is <10% failure rate according ISO15874-2.

Examples a) Preparation of the Catalyst

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of diethylhexylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 491 566, EP 591 224 and EP 586 390.

For the preparation of the Inventive example IE1 as well as of the Comparative Example CE1 triethylaluminium (TEAL), dicyclopentyldimethoxysilane (DCPDMS) as donor (Do), catalyst as produced above and vinylcyclohexane (VCH) were added into oil, like mineral oil, e.g. Technol 68 (kinematic viscosity at 40° C. 62-74 cSt), in amounts so that A/Ti was 3-4 mol/mol, Al/Do was as well 3-4 mol/mol, and weight ratio of VCH/solid catalyst was 1:1. The mixture was heated to 60 to 65° C. and allowed to react until the content of the unreacted vinylcyclohexane in the reaction mixture was less than 1000 ppm. Catalyst concentration in the final oil-catalyst slurry was 10 to 20 wt.-%.

b) Polymerisation of Inventive Example IE1 and Comparative Example CE1

For the polymerisation of Inventive Example IE1 and Comparative Example CE1 the catalyst including polymerised VCH was fed together with propylene to a prepolymerisation reactor. Triethylaluminium was used as a cocatalyst and dicyclopentyldimethoxysilane as a donor. The polymerisation conditions and feeds are listed in Table 1.

The slurry from the prepolymerisation stage was directly fed to a loop reactor. Propylene, hydrogen and ethylene were further added to the loop reactor. The polymerisation conditions and feeds are listed in Table 1.

The slurry from loop reactor was introduced to a gas phase reactor via direct feed line, i.e. without monomer flashing in-between the reactors.

Propylene, ethylene and hydrogen were fed to the first gas phase reactor and further transferred to a second gas phase reactor.

The polymerisation conditions and feeds are listed in Table 1.

The final Poly-VCH content in the obtained final polymers of Inventive Example IE1 and Comparative Example CE1 was 200 ppm or less.

The preparation of Comparative Example CE1 was conducted otherwise in the same way but the $3^{rd}$ polymerization stage was not present and the process was run as shown in Table 1.

a) Compounding

The polypropylene resins of Inventive Example IE1 and Comparative Example CE1 emerging from the gas phase reactor (identified as reactor powder in Tables 1) were compounded together with conventional antioxidants and Ca-stearate (same amounts were used for Inventive and Reference Examples) and pelletized in a W&P ZSK 70 twin-screw extruder (Coperion) at a melt temperature of 240° C. and an extruder throughput of 200 kg/h.

The polymer pellets of inventive and reference examples were prepared to test specimens for the mechanical and thermal tests as listed below or were extruded to pipes in order to test the processability of the compositions.

TABLE 1

Polymerisation conditions of Examples CE1 and IE1.

| | | Value | Unit | CE1 | IE1 |
|---|---|---|---|---|---|
| $1^{st}$ stage including Preoplymerisation | Prepoym. | Catalyst | | For both inventive and comparative examle pVCH modified catalyst according to the example | |
| | | Donor | | Dicyclopentyldimethoxysilane | |
| | | Cocat. feed | [g/t($C_3$)] | 200 | 740 |
| | | Donor feed | [g/t(PP)] | 40 | 14 |
| | | T | [° C.] | 26 | 29 |
| | | P | [bar] | 53 | 53 |
| | Loop | T | [° C.] | 68 | 70 |
| | | $H_2/C_3$ | [mol/kmol] | 0.14 | 2.0 |
| | | $C_2/C_3$ | [mol/kmol] | 12.2 | 7.8 |
| | | P | [bar] | 53 | 50 |

TABLE 1-continued

Polymerisation conditions of Examples CE1 and IE1.

|  |  | Value | Unit | CE1 | IE1 |
|---|---|---|---|---|---|
|  | V | $MFR_2$ | [g/10 min] | 0.13 | 2.5 |
|  |  | XCS | [wt.-%] | 10 | 5.1 |
|  |  | $C_2$ | [wt-% (mole-%)] | 4.8 (7.0) | 3.1 (4.6) |
| $2^{nd}$ stage | Gpr1 | T | [° C.] | 70 | 80 |
|  |  | $H_2/C_3$ | [mol/kmol] | 15 | 2.5 |
|  |  | $C_2/C_3$ | [mol/kmol] | 20.1 | 35 |
|  |  | P | [bar] | 27 | 22 |
|  |  | Split: V:W |  | 65:35 | 50:50 |
|  | W | $MFR_2$* | [g/10 min] | 0.55 | 0.31 |
|  |  | XCS* | [wt.-%] | 2.8 | 7.0 |
|  |  | $C_2$* | [mole-%] | 1.9 (2.8) | 4.1 (6.0) |
|  | X | $MFR_2$ | [g/10 min] | 0.21 | 0.84 |
|  |  | XCS | [wt.-%] |  | 5.5 |
|  |  | $C_2$ | [wt-% (mole-%)] | 3.8 (5.6) | 3.6 (5.3) |
|  |  | $MFR_2$: X/V |  |  | 0.34 |
|  |  | $C_2$: V/X |  |  | 0.86 |
| $3^{rd}$ stage | Gpr2 | T | [° C.] |  | 65 |
|  |  | $H_2/C_3$ | [mol/kmol] |  | 1.7 |
|  |  | $C_2/C_3$ | [mol/kmol] |  | 175 |
|  |  | P | [bar] |  | 17 |
|  |  | Split: (V + X):Y |  |  | 93:7 |
|  | Y | $MFR_2$* | [g/10 min] |  | 0.02 |
|  |  | XCS* | [wt.-%] |  | >12 |
|  |  | $C_2$* | [wt.-% (mole-%)] |  | 19 (26) |
|  | U**(Final) | $MFR_2$ | [g/10 min] | 0.21 | 0.61 |
|  |  | XCS | [wt.-%] | 7.4 | 9.1 |
|  |  | $C_2$ | [wt-% (mole-%)] | 3.8 (5.6) | 4.5 (6.6) |
|  |  | $MFR_2$: U/X |  |  | 0.73 |
|  |  | Flex. Mod. | [MPa] | 790 | 894 |
|  |  | NIS, RT | [kJ/m$^2$] | 41 | 68 |
|  |  | NIS, 0° C. | [kJ/m$^2$] | 8.0 | 9.9 |
|  |  | Stress at yield | [MPa] | 29 | 25 |
|  |  | Strain at yield | [%] | 13 | 13 |
|  |  | $T_M$ | [° C.] | 147 | 145 |
|  |  | $T_C$ | [° C.] | 115 | 117 |
|  |  | PI | [Pa$^{-1}$] | 4.1 | 3.6 |
|  |  | Productivity | [kg(PP)/cat)] | 33 | 46 |
|  |  | Speed | [t/h] | 38 | 50 |

*Values are calculated.
**measured from final composition (U) (=final multimodal polypropylene composition) after the compounding step (a) as described above b) Pipe Tests:

Test Pipe preparation: The polymer of Inventive Example were extruded to pipes by using a Reifenhauser 381-1-70-30 pipe extruder. Output of the extruder was 46 to 48 kg/h, melt pressure was 180 to 220 barg and the melt temperature was 180 to 230° C. The test pipes with varying dimensions were used in the below pipe tests A.-B. Pipe dimensions are given below under each test A. and B.

The shrinkage of the produced test pipes was clearly less than 5%.

A. Pressure test:

Test pipes with diameter of 32 mm and wall thickness of 3 mm were prepared for the polymers of inventive example IE1.

Pressure test performance was measured according to ISO 1167. In this test, a specimen is exposed to constant circumferential (hoop) stress of 16 MPa at elevated temperature of 20° C. in water-in-water or 4.9 MPa at a temperature of 95° C. in water-in-water. The time in hours to failure is recorded. The tests were performed on pipes produced on conventional pipe extrusion equipment, the pipes having a diameter of 32 mm and a wall thickness of 3 mm. The results are shown in Table 2.

TABLE 2

| Example | IE1 |
|---|---|
| Pressure resistance at 20° C. and 16 MPa [h] | 7 |

B. Charpy impact at 0° C. measurement from samples prepared from test pipes according ISO9854-1 and 2:1994

Test pipes with a diameter of 32 mm and a wall thickness of 4.4 mm were prepared for polymer of inventive examples IE1.

Test piece were prepared out of the pipe. Test piece dimension 120×15 mm. The criteria in the application standard is <10% failure rate according ISO15874-2. The results are given in below table 3:

TABLE 3

| Charpy impact at 0° C., no notch, support spacing 70 mm; Hammer 15Joule | |
|---|---|
| Example | IE1 |
| Charpy impact at 0° C., no notch [kJ/m$^2$] | No break |

The invention claimed is:

1. A multimodal polypropylene composition suitable for pipe applications, comprising:
   a multimodal propylene copolymer (U) that comprises:
   (A) from 75 to 98 wt.-% of a propylene random copolymer composition (X) which comprises:
      i. from 40 to 53 wt.-% of a first propylene homopolymer or random copolymer (V) having an MFR$_2$ of from 1.0 to 5.0 g/10 min; and
      ii. from 47 to 60 wt.-% of a second propylene homopolymer or random copolymer (W), having an MFR$_2$ of from 0.10 to 0.60 g/10 min;
      iii. provided that at least one of said first propylene homopolymer or random copolymer (V) and said second propylene homopolymer or random copolymer (W) is a propylene random copolymer having a comonomer selected from at least one of the group consisting of ethylene and C$_4$-C$_8$ alpha-olefins; and
   (B) from 2 to 25 wt.-% of a propylene copolymer (Y) having a melt flow rate MFR$_2$ of 0.0001 to 0.1 g/10 min or a content of comonomer units of from 9.0 to 40.0 mole-% or both, wherein the comonomer is selected from at least one of the group consisting of ethylene and C$_4$-C$_8$ alpha-olefins;
   (C) wherein the multimodal propylene copolymer (U) has at least one comonomer selected from the group consisting of ethylene and C$_4$-C$_8$ alpha-olefins in a total amount of 4.0 to 10.0 mole-%;
   wherein the multimodal polypropylene composition has:
      i. a melt flow rate MFR$_2$ (2.16 kg, 230° C.) of 0.35 to 1.00 g/10 min determined according to ISO 1133;
      ii. a content of xylene cold solubles (XCS) of 6.0 to 13.5 wt.-% determined at 25° C. according to ISO 16152; and
      iii. a polydispersity index PI of 2.5 to 4.0 Pa$^{-1}$ determined by rheological measurements according to ISO 6721-1 and ISO 6721-10.

2. The multimodal polypropylene composition according to claim 1, having:
   a flexural modulus of 830 to 1100 MPa, determined according to ISO 178 at a test speed of 2 mm/min and a force of 100 N on test specimens having a dimension of 80×10×4.0 mm$^3$ (length×width×thickness) prepared by injection moulding according to EN ISO 1873-2; and
   a Charpy Notched Impact Strength at 23° C. of at least 30 kJ/m$^2$, determined according to ISO 179/1eA:2000 using notched injection moulded specimens.

3. The multimodal polypropylene composition according to claim 1, wherein the propylene random copolymer composition (X) has a melt flow rate MFR$_2$ of 0.25 to 1.0 g/10 min, or a content of comonomer units of from 2.0 to 12.0 mole-%, or both.

4. The multimodal polypropylene composition according to claim 1, wherein:
   the first propylene random copolymer (V) has a content of comonomer units of from 1.0 to 6.0 mole-%; and
   the second propylene random copolymer (W) has a content of comonomer units of from 3.0 to 12.0 mole-%.

5. The multimodal polymer composition according to claim 1, wherein at least said second propylene homopolymer or random copolymer (W) is a propylene random copolymer.

6. The multimodal polypropylene composition according to claim 1, wherein the MFR$_2$ of the first propylene homopolymer or random copolymer (V) is higher than the MFR$_2$ of the second propylene homopolymer or random copolymer (W) and the MFR$_2$ of the second propylene homo polymer or random copolymer (W) is higher than the MFR$_2$ of the propylene copolymer (Y); and
   optionally, the comonomer content of the first propylene random copolymer (V) is lower than the comonomer content of the second propylene random copolymer (W) and the comonomer content of the second propylene random copolymer (W) is lower than the comonomer content of the propylene copolymer (Y).

7. The multimodal polypropylene composition according to claim 1, further comprising from 0.1 to 10000 ppm by weight of a nucleating agent (Z).

8. The multimodal propylene copolymer composition according to claim 7, wherein the nucleating agent (Z) is a polymeric nucleating agent.

9. The multimodal polypropylene composition according to claim 8, wherein the polymeric nucleating agent is a polymer of vinylcyclohexane and/or 3-methyl-1-butene.

10. The multimodal polymer composition according to claim 8, wherein the polymeric nucleating agent (Z) is a polymer of at least one vinyl compound according to one of formulas (1) and (2):

$$CH_2=CH-CHR^1R^2 \qquad (1)$$

wherein R$^1$ and R$^2$ together form a 5- or 6-membered saturated, unsaturated or aromatic ring that optionally contains substituents, or independently represent an alkyl group comprising 1 to 4 carbon atoms;

$$CH_2=CH-CR^1R^2 \qquad (2)$$

wherein R$^1$ and R$^2$ together form a 5- or 6-membered aromatic ring that optionally contains substituents.

11. The multimodal polypropylene composition according to claim 1, wherein the relationship: crystallization temperature TC×comonomer content of the multimodal propylene copolymer (U) [° C. mole-%] is at least 400° C. mole-%.

12. The multimodal polypropylene composition according to claim 1, which has a Charpy Notched Impact Strength at 0° C. of at least 4.0 kJ/m$^2$, determined according to ISO 179/1eA:2000 using notched injection moulded specimens.

13. The multimodal polypropylene composition according to claim 1 obtained by a process, wherein propylene and at least one comonomer selected from alpha-olefins with 2 or 4 to 8 carbon atoms is polymerised in the presence of
   (I) a solid catalyst component comprising a magnesium halide, a titanium halide and an internal electron donor; and
   (II) a cocatalyst comprising an aluminium alkyl and optionally an external electron donor; and (III) an optional nucleating agent (Z), the multistage process comprising the steps of (A) continuously polymerizing propylene, optionally a comonomer selected from the group of ethylene and at least one C4-C8 alpha-olefins, in a first polymerisation stage by introducing streams of propylene, hydrogen and optionally said comonomer into the first polymerisation stage at a temperature of from 60 to 100° C. and a pressure of from 40 to 65 bar to produce a first propylene polymer (V), wherein the first propylene polymer (V) has a melt flow rate $MFR_2$ (2.16 kg, 230° C.; ISO 1133) of from 1.0 to 5.0 g/10 min;

(B) withdrawing from the first polymerisation stage a stream comprising the first propylene polymer (V) and transferring said stream into a second polymerisation stage;

(C) polymerizing propylene in the presence of said first propylene polymer (V) in the second polymerisation stage at a temperature of from 65 to 90° C. and a pressure of from 19 to 25 bar by introducing streams of propylene, hydrogen, and optionally at least one comonomer, to produce a copolymer composition (X) of said first propylene polymer (V) and a second propylene polymer (W); provided that at least one of said first and second polymers (V) and (W) is a propylene random copolymer;

said copolymer composition (X) comprising from 30 to 60 wt.-% of said first propylene polymer (V) and from 40 to 70 wt.-% of said second propylene polymer (W) with respect to the copolymer composition (X), wherein the copolymer composition (X) has a melt flow rate $MFR_2$ of 0.25 to 1.0 g/10 min which is lower than the $MFR_2$ of said first polymer (V);

(D) withdrawing a stream comprising the copolymer composition (X) from the second polymerisation stage and transferring said stream into a third polymerisation stage;

(E) polymerizing propylene and at least one comonomer in the presence of the copolymer composition (X) in the third polymerisation stage at a temperature of from 65 to 90° C. and a pressure of from 10 to 100 bar by introducing streams of propylene, hydrogen, and at least one comonomer, to produce the multimodal propylene copolymer (U) comprising the copolymer composition (X) and a further propylene copolymer (Y) component, wherein the multimodal propylene copolymer (U) has a melt flow rate $MFR_2$ of 0.35 to 1.0 g/10 min;

wherein the multimodal propylene copolymer (U) comprises from 75 to 98 wt.-% of said copolymer composition (X) and from 2 to 25 wt.-% of said propylene copolymer (Y); and wherein the comonomer content of the propylene copolymer (Y) is from 9.0 to 40 mole-%;

(F) continuously withdrawing a stream comprising the multimodal propylene copolymer (U) from the third polymerisation stage and optionally mixing the multimodal propylene copolymer (U) with additives; and (G) extruding the multimodal propylene copolymer (U) into pellets.

14. A moulded article or a pressure pipe, comprising the multimodal polypropylene composition according to claim 1.

* * * * *